US008423699B2

(12) United States Patent
Takahashi

(10) Patent No.: US 8,423,699 B2
(45) Date of Patent: Apr. 16, 2013

(54) INFORMATION PROCESSING APPARATUS AND METHOD FOR CONTROLLING INFORMATION PROCESSING APPARATUS

(75) Inventor: Jin Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/929,718

(22) Filed: Feb. 10, 2011

(65) Prior Publication Data

US 2011/0145455 A1 Jun. 16, 2011

Related U.S. Application Data

(63) Continuation of application No. PCT/JP2008/064872, filed on Aug. 21, 2008.

(51) Int. Cl.
G06F 13/00 (2006.01)
(52) U.S. Cl.
USPC .......................................... 710/316; 710/317
(58) Field of Classification Search ............... 710/4, 26, 710/31, 305, 306, 312, 314–317; 370/392, 370/466, 467; 709/232, 238
See application file for complete search history.

(56) References Cited

U.S. PATENT DOCUMENTS

| | | | | |
|---|---|---|---|---|
| 5,758,053 A | * | 5/1998 | Takeuchi et al. ............... | 714/4.4 |
| 5,968,189 A | * | 10/1999 | Desnoyers et al. .......... | 714/47.2 |
| 6,035,414 A | * | 3/2000 | Okazawa et al. ............ | 714/6.32 |
| 6,192,402 B1 | | 2/2001 | Iwase | |
| 6,243,830 B1 | * | 6/2001 | Nakatsugawa ................. | 714/15 |
| 6,295,573 B1 | * | 9/2001 | Bailey et al. .................. | 710/260 |
| 6,718,421 B1 | * | 4/2004 | Conroy ......................... | 710/305 |
| 6,985,482 B2 | * | 1/2006 | Suzuki .......................... | 370/380 |
| 7,093,154 B2 | * | 8/2006 | Bartfai et al. ................. | 714/4.3 |
| 7,281,055 B2 | * | 10/2007 | Glasco et al. ................. | 709/232 |
| 7,633,856 B2 | * | 12/2009 | Ikawa ........................... | 370/217 |

(Continued)

FOREIGN PATENT DOCUMENTS

| | | |
|---|---|---|
| JP | 05-134998 | 6/1993 |
| JP | 06-052130 | 2/1994 |

(Continued)

OTHER PUBLICATIONS

English Translation of the International Preliminary Report on Patentability mailed Mar. 3, 2011 in corresponding International Patent Application PCT/JP2008/064872.
Japanese Office Action issued Oct. 30, 2012 in corresponding Japanese Patent Application No. 2010-525527.

*Primary Examiner* — Khanh Dang
(74) *Attorney, Agent, or Firm* — Staas & Halsey LLP

(57) ABSTRACT

According to an aspect of the embodiment, a system control apparatus includes a control signal transmitting unit which transmits a control signal to control circuits via first signal line. The control signal includes a command for performing a control setting on other control circuits other than own control circuit or to all control circuits. Each control circuit includes a signal receiving unit which receives the control signal transmitted from the control signal transmitting unit via the first signal line, a signal transfer unit which transfers the command included in the received control signal via second signal lines to the control circuit, and a control setting unit which performs the control setting on the own control circuit according to the command included in the received control signal or a command transferred from the other control circuits other than the own control circuit.

10 Claims, 17 Drawing Sheets

U.S. PATENT DOCUMENTS

| | | | |
|---|---|---|---|
| 7,734,948 B2 * | 6/2010 | Langford et al. | 714/4.1 |
| 7,836,340 B2 * | 11/2010 | Schuetz | 714/25 |
| 2006/0174048 A1 * | 8/2006 | Ohara et al. | 710/305 |
| 2008/0162734 A1 * | 7/2008 | Uehara et al. | 710/3 |
| 2009/0113094 A1 * | 4/2009 | Ludewig et al. | 710/100 |
| 2010/0146180 A1 * | 6/2010 | Takahashi et al. | 710/302 |

FOREIGN PATENT DOCUMENTS

| | | |
|---|---|---|
| JP | 09-160875 | 6/1997 |
| JP | 11-068745 | 3/1999 |
| JP | 2007-128285 | 5/2007 |

* cited by examiner

INFORMATION PROCESSING APPARATUS AND METHOD FOR CONTROLLING INFORMATION PROCESSING APPARATUS

CROSS-REFERENCE TO RELATED APPLICATIONS

This is a continuation application of PCT application serial number PCT/JP2008/064872, filed on Aug. 21, 2008.

FIELD

The embodiments discussed herein are related to an information processing apparatus and a method for controlling the information processing apparatus.

BACKGROUND

There is a server which includes a plurality of control circuits (hereinafter also referred to as LSIs (Large Scale Integrated circuits)) and a system control apparatus (hereinafter also referred to as SVP (Service Processor)) that manages and controls the LSIs. In an information processing apparatus such as the server, the SVP and the LSIs are connected by a system control serial bus such as an I2C (Inter-Integrated Circuit) and the SVP manages and controls the LSIs via the system control serial bus.

A multiprocessor system is known in which an SVP and processors are connected by a duplex bus including a simple system bus and a diagnosis bus and a function of a processor in which a failure occurs is backed up by another processor connected to the duplex bus to continue processing.

A method is known in which, in a multi-node information processing apparatus, an initialization command is output from an SVP to a cross bar, and, after the output, the initialization command is output from the cross bar to nodes, whereby the initialization command is output in a tree shape.

Patent Document 1: Japanese Laid-Open Patent Publication No. 6-52130
Patent Document 2: Japanese Laid-Open Patent Publication No. 2007-128285

SUMMARY

According to an aspect of the embodiment, an information processing apparatus includes: a system control apparatus connected to each of a plurality of control circuits via a first signal line; a plurality of control circuits each of which is connected to other control circuits other than own control circuit via second signal lines; a control signal transmitting unit provided in the system control apparatus, and that transmits a control signal to the plurality of control circuits via the first signal line, the control signal including a command for performing a control setting on the other control circuits other than the own control circuit or to all of a plurality of control circuits; a signal receiving unit provided in each of the plurality of control circuits, and that receives the control signal transmitted from the control signal transmitting unit of the system control apparatus via the first signal line; a signal transfer unit provided in each of the plurality of control circuits, and that transfers the command included in the control signal received by the signal receiving unit to a control circuit that is a control setting target via the second signal lines; and a control setting unit provided in each of the plurality of control circuits, and that performs the control setting on the own control circuit according to a command included in the control signal received by the signal receiving unit or a command transferred from the other control circuits other than the own control circuit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 16:
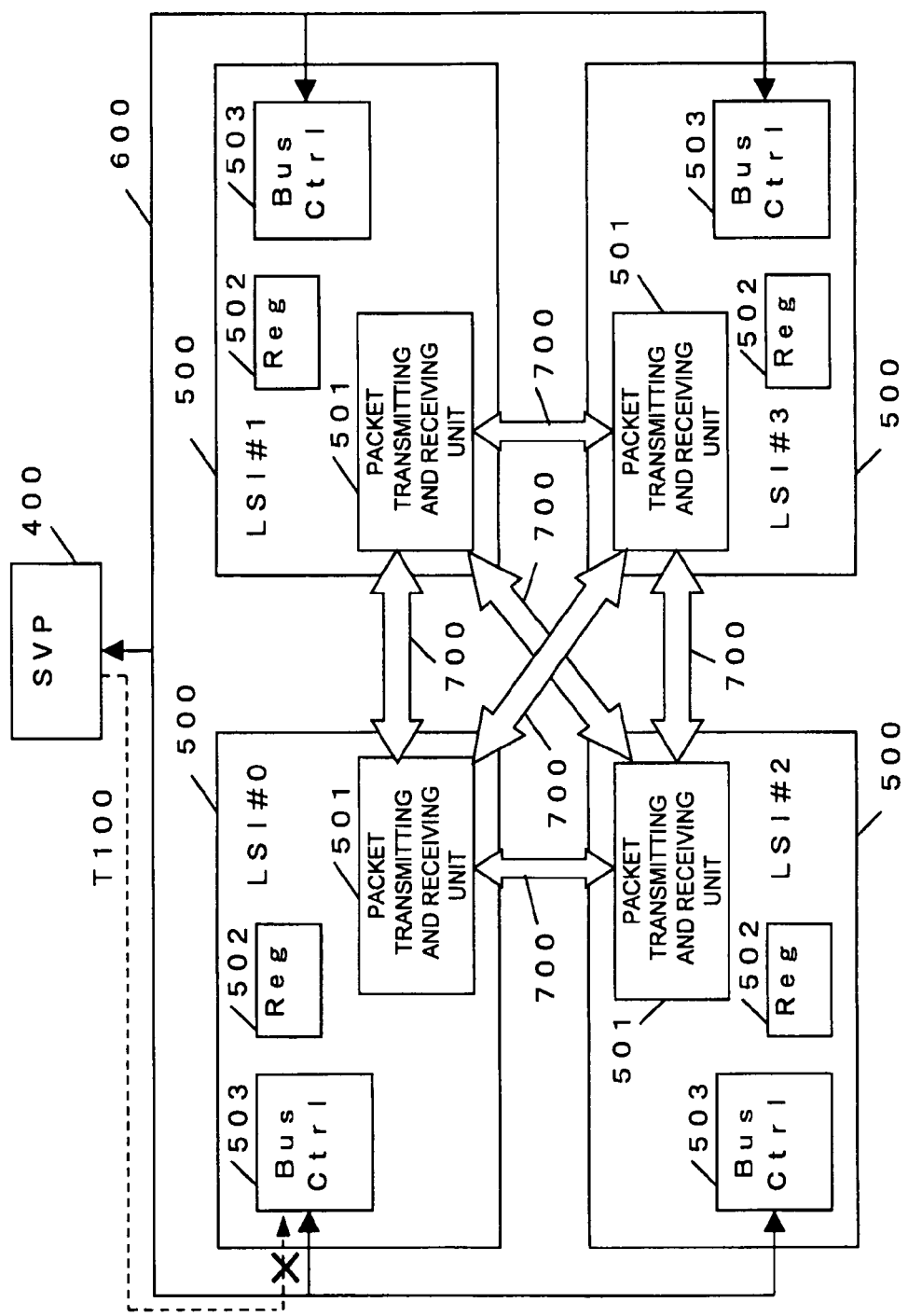
FIG. 16 is a diagram illustrating a first problem examined by the inventor.
Figure 17:
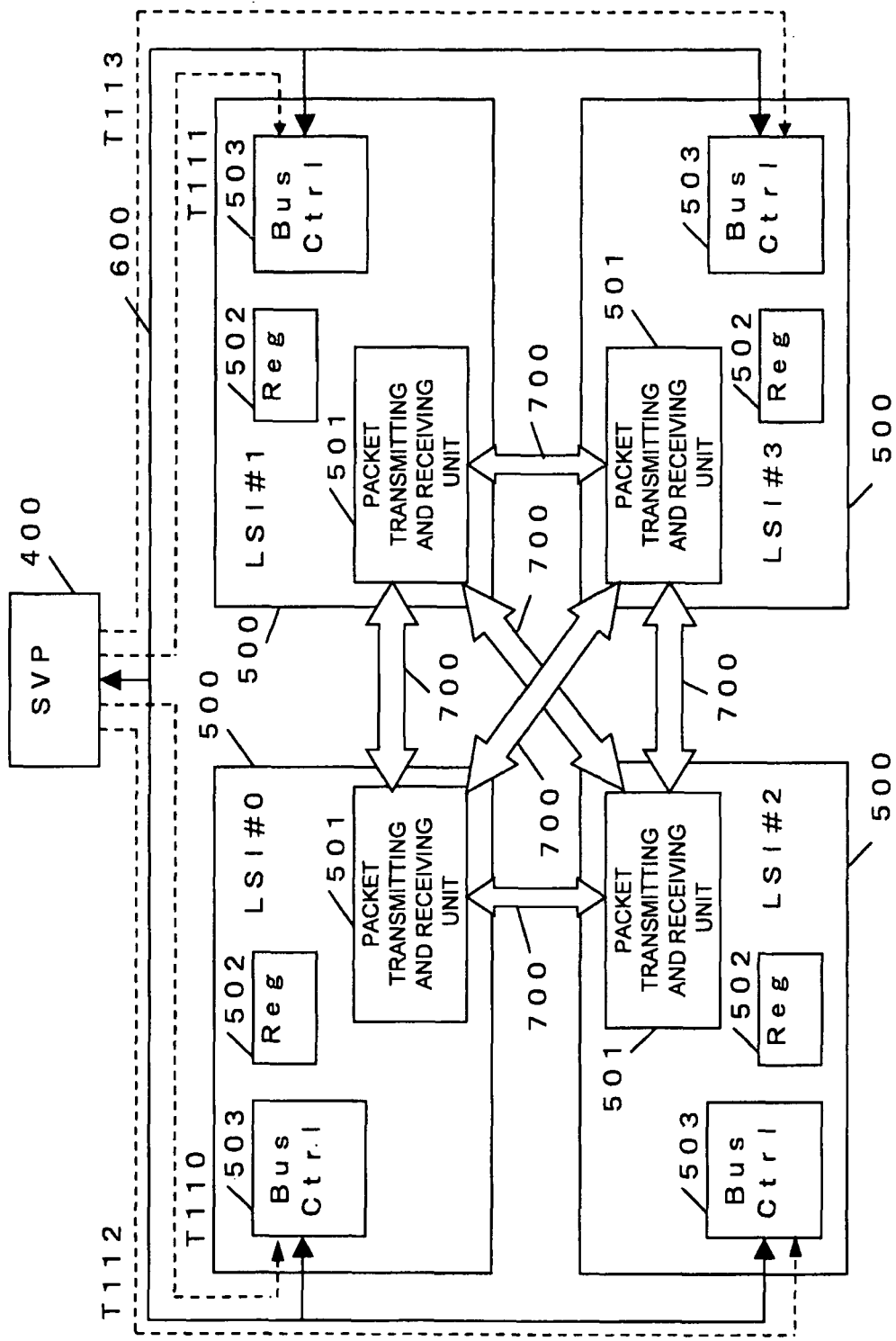
FIG. 17 is a diagram illustrating a second problem examined by the inventor.

FIGS. 16 and 17 are diagrams respectively illustrating a first problem and a second problem examined by us. FIG. 16 illustrates an operation in the case in which an LSI 500 is inaccessible from a SVP 400 in an information processing apparatus by a system control serial bus in the past. FIG. 17 illustrates an access operation in the case in which the SVP 400 performs the same setting in a plurality of LSIs 500 in the same system as FIG. 16.

In FIGS. 16 and 17, the SVP 400 is connected to the plurality of LSIs 500 via a serial bus 600. In other words, the respective LSIs 500 are connected to one SVP 400 via the serial bus 600. Each of the LSIs 500 includes a packet transmitting and receiving unit 501, a Reg 502, and a BUS Ctrl 503. The LSI 500 representatively indicates an LSI #0, an LSI #1, an LSI #2, and an LSI #3.

The SVP 400 is a system control apparatus that manages and controls each of the LSIs 500 connected thereto via the serial bus 600. The LSI 500 is a control circuit that performs various kinds of control processing, arithmetic processing, and the like in the information processing apparatus. The packet transmitting and receiving unit 501 is a functional unit that transmits and receives packet data to and from the packet transmitting and receiving units of the other LSIs 500 via a data bus 700.

The Reg 502 is a control register that performs setting of various kinds of control and performs reading control information and the like in the LSI 500. The Bus Ctrl 503 performs transmission and reception control of serial data for receiving a control command transmitted from the SVP 400, and performs transmitting a response signal or the like to the SVP 400 via the serial bus 600.

The first problem and the second problem are explained below with reference to FIGS. 16 and 17.

(1) The first problem is as follow. When a serial bus controller (Bus Ctrl 503) of a control circuit (the LSI 500) or the serial bus 600 connecting the LSI 500 and the LSI 500 breaks down, a system control apparatus (the SVP 400) cannot perform a control setting on the LSI 500. Specifically, in FIG. 16, after power-on of a power supply for the information processing apparatus, in order to perform initial setting of the LSIs, the SVP 400 transmits a control command to the LSI #0 via the serial bus 600 (refer to T100). When the Bus Ctrl 503 of the LSI #0 is broken down, the SVP 400 cannot perform the control setting on the LSI #0 according to the control command. In a configuration example of the information processing apparatus illustrated in FIG. 16, the SVP 400 cannot transmit the control command to the LSI #0 via the LSIs 500 other than the LSI #0. Therefore, the LSI #0 is not performed the control setting. As a result, in some case, the information processing apparatus causes abnormality that brings about start stop or the like.

(2) Second problem is as follow. When a system size of the information apparatus increases, for example, the number of LSIs 500 included in the information processing apparatus is large, in particular, when the SVP 400 executes control setting of the same content on all the LSIs 500, a load on the SVP 400 increases in proportion to the number of LSIs 500 as control setting targets. For example, as indicated by T110 to T113 of FIG. 17, when the SVP 400 performs the control setting of the same content to each of the LSIs #0 to #3, in the related art, the SVP 400 transmits a control command to the Bus Ctrls 503 of the LSIs 500 to perform the control setting. In this way, in the related art, the SVP 400 transmits the control command individually to the respective LSIs. Therefore, when the system size increases, a load on the SVP 400 increases.

An information processing apparatus is provided in which, when an access failure occurs in an access from a system control apparatus to a plurality of control circuits via a serial bus which connects the system control apparatus and the plurality of control circuits, the system control apparatus can access, via accessible other control circuits, a control circuit which has a relation of the access failure to perform a control setting.

An information processing apparatus is provided which, when a system control apparatus performs a control setting of a same content to all of a plurality of control circuits, can reduce a load of the system control apparatus.

A method for controlling information processing apparatus is provided in which, when an access failure occurs in an access from a system control apparatus to a plurality of control circuits via a serial bus which connects the system control apparatus and the plurality of control circuits, the system control apparatus can access, via accessible other control circuits, a control circuit which has a relation of the access failure to perform a control setting.

A method for controlling information processing apparatus is provided which, when a system control apparatus performs a control setting of a same content to all of a plurality of control circuits, can reduce a load of the system control apparatus.

According to the apparatus and method for information processing, for example, when the access failure occurs in the access from the system control apparatus to the plurality of control circuits via the serial bus, the system control apparatus accesses, via accessible other control circuits, the control circuit which has a relation of the access failure. Consequently, the system control apparatus can transmit a control command to the control circuit, which is a control setting target, via the other control circuits, so that the system control apparatus can perform a control setting for the control circuit which has the relation of the access failure. As a result, the information processing apparatus can prevent a failure that seriously affects the information processing apparatus. The reliability of the information processing apparatus is improved.

According to the apparatus and method for information processing apparatus, for example, when the system control apparatus performs a control setting of a same content to all of a plurality of control circuits, the system control apparatus selects a representative control circuit, and transmits a control command to the representative control circuit. Further, the representative control circuit transfers a control command used for control setting for the other control circuits. As a result, the information processing apparatus can reduce a load of processing of command exchange in the control setting for the system control apparatus, and can reduce time required for the setting of the control circuits.

Preferred embodiments of the present invention will be explained with reference to accompanying drawings.

Figure 1:
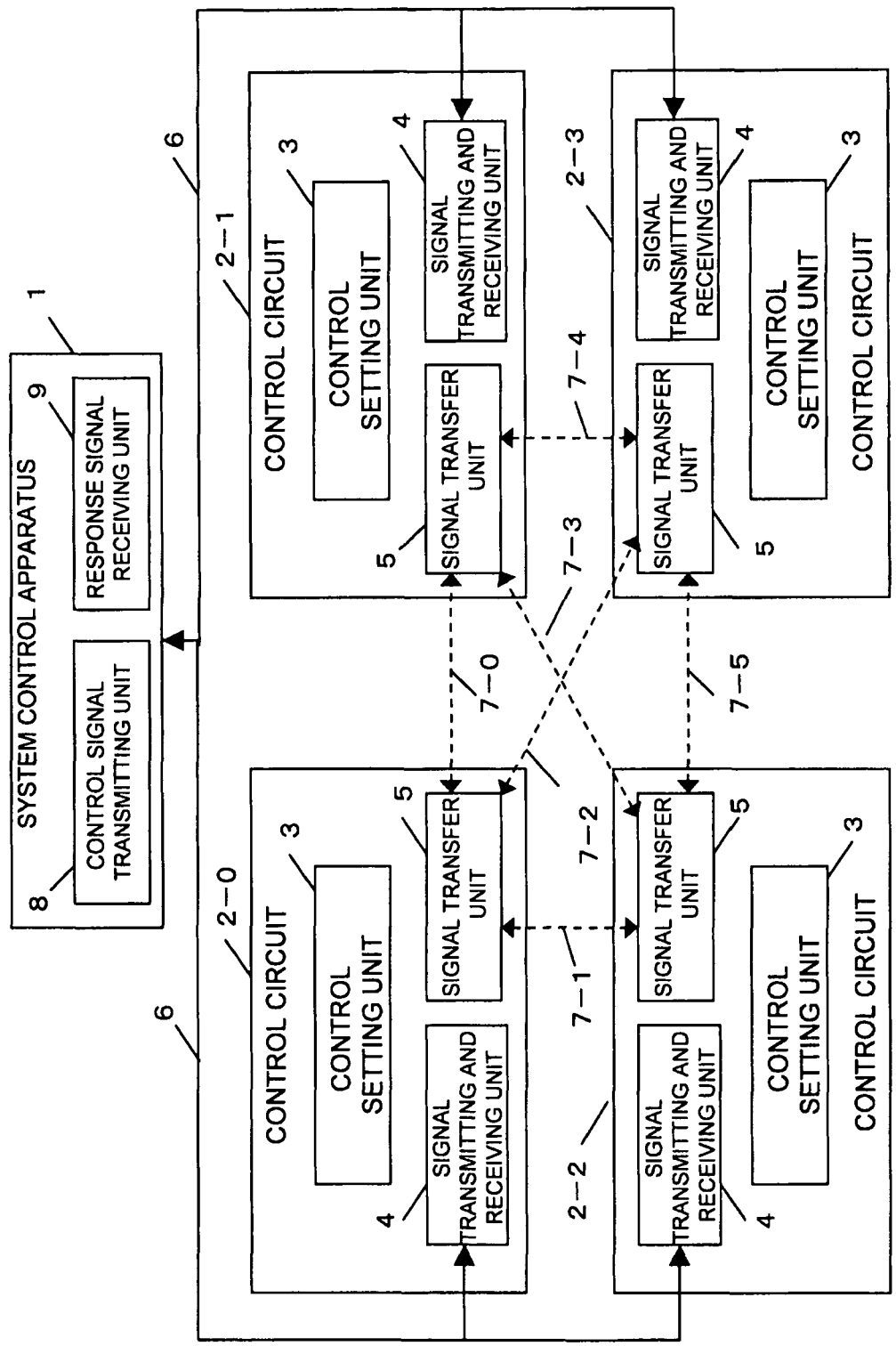
FIG. 1 is a diagram illustrating a basic configuration of an information processing apparatus.

FIG. 1 is a diagram illustrating a basic configuration of an information processing apparatus. The information processing apparatus includes a system control apparatus 1 and a plurality of control circuits 2. In FIG. 1, the system control apparatus 1 is connected to each of the plurality of control circuit 2 (control circuits 2-0, 2-1, 2-2, and 2-3) via a signal line 6 (a first signal line). Each of the plurality of control circuit 2 is mutually connected to other control circuits other than own control circuit via signal lines 7 (signal lines 7-0, 7-1, 7-2, 7-3, 7-4, and 7-5), which is second signal lines. The system control apparatus 1 includes control signal transmitting unit 8 and response signal receiving unit 9. The control circuit 2 includes control setting unit 3, signal transmitting and receiving unit 4, and signal transfer unit 5.

The control signal transmitting unit 8 included in the system control apparatus 1 transmits, to each control circuit 2, a control signal including a command for performing a control setting on the control circuit 2 (hereinafter referred to as control command) via the signal line 6, which is a serial bus. For example, the control signal transmitting unit 8 transmits, to the control circuit 2, a control signal including a command for performing the control setting on control circuits other than the control circuit 2, or to all of the plurality of control circuits 2. The response signal receiving unit 9 receives a response signal to the control signal, which is transmitted from the each control circuit 2.

The signal transmitting and receiving unit 4, which is included in the control circuits 2, receives the control signal transmitted from the control signal transmitting unit 8 of the system control apparatus 1. The signal transmitting and receiving unit 4 transmits a response signal to the received control signal to the response signal receiving unit 9 of the system control apparatus 1. The control setting unit 3 performs the control setting on the own control circuit (for example, control setting such as initial setting of the control circuit 2) according to the control command included in the control signal received by the signal transmitting and receiving unit 4, or the command transferred from the other control circuits other than the own control circuit. The signal transfer unit 5 transfers, according to an instruction of the control setting unit 3, the signal including the control command received by the signal transmitting and receiving unit 4 to the signal transfer unit 5 of the other control circuits, which are control setting targets, via the signal lines 7. The signal lines 7 may be signal lines used for a serial bus, a data bus, or the like.

The operation of the information processing apparatus illustrated in FIG. 1 is explained below. The system control apparatus 1 transmits a control signal including a control command for performing the control setting on the control circuit 2 (for example, operation setting or setting for performing log information collection or the like), via the signal line 6 which is connected to the control circuit 2. The control signal further includes information instructing transfer of the control command to the other control circuits 2 (transfer instruction information). The control circuit 2 receives, in the signal transmitting and receiving unit 4, the control signal including the control command transmitted from the system control apparatus 1 via the signal line 6. The signal transmitting and receiving unit 4 that receives the control signal sends the control command included in the received control signal to the control setting unit 3. The control setting unit 3 receives the control command from the signal transmitting and receiving unit 4, and performs control setting for the control circuit 2 according to the received control command. The control setting unit 3 performs, according to the transfer instruction information included in the control signal, control for transferring the control command to the other control circuits 2 via the signal lines 7. Consequently, the system control apparatus 1 can transfer the control command to, for example, the control circuit 2-1 via the signal line 6 and to the control circuit 2-0 via the signal line 7-0. In other words, the system control apparatus 1 can transmit the control command to the control circuits 2 via the signal line 6 or a plurality of communication routes via the signal line 6 and the signal lines 7.

Figure 2:
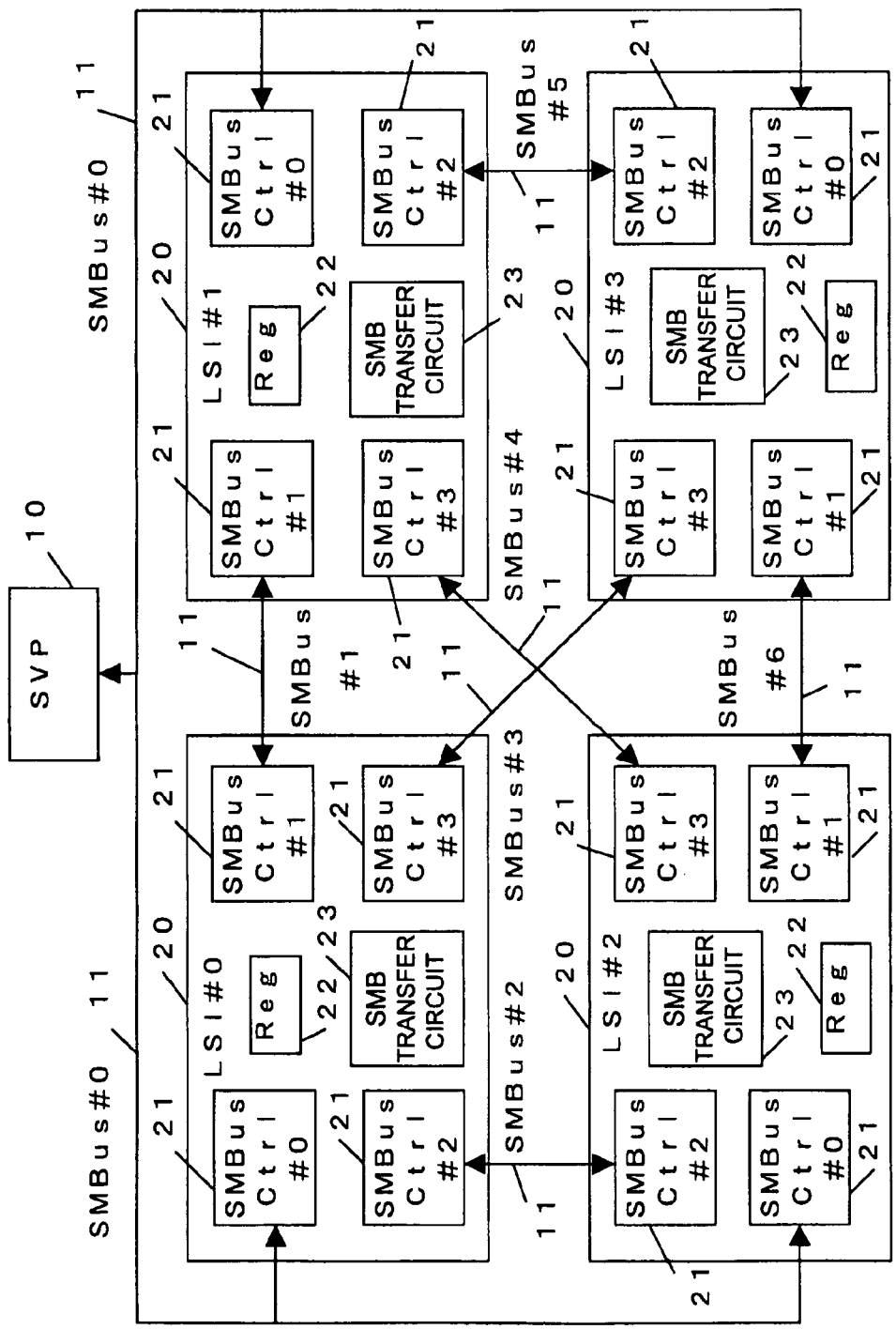
FIG. 2 is a diagram illustrating a basic configuration of a first embodiment and a second embodiment of the information processing apparatus.
Figure 3:
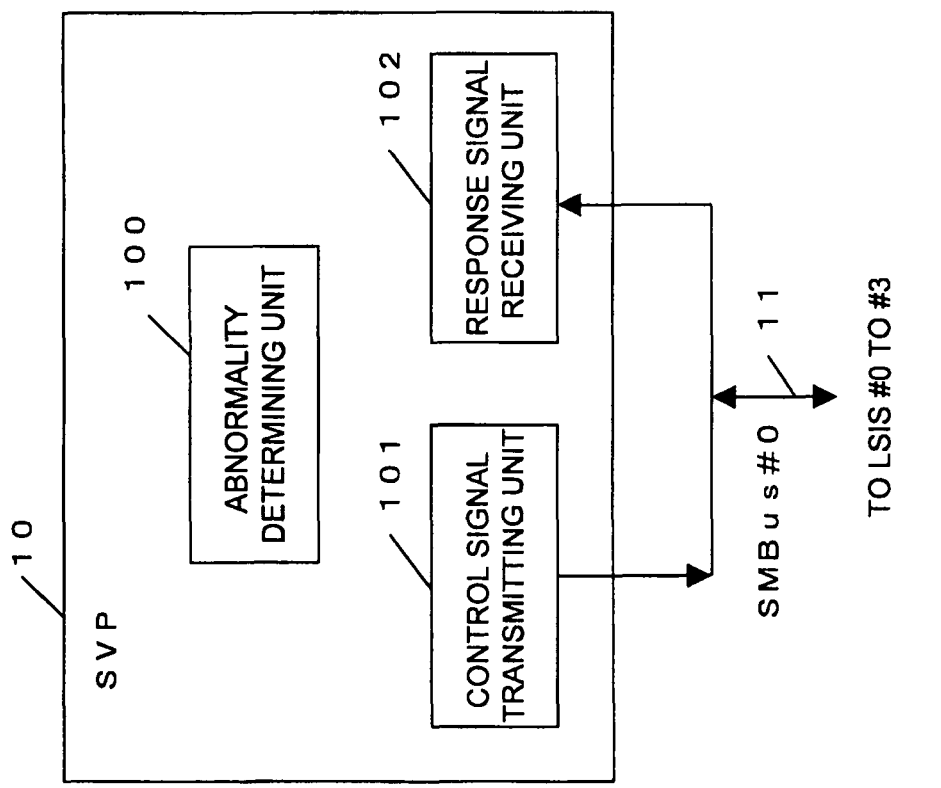
FIG. 3 is a diagram of a basic configuration of an SVP.

FIG. 2 is a diagram illustrating a basic configuration of a first embodiment and a second embodiment of the information processing apparatus. FIG. 3 is a diagram illustrating a basic configuration of an SVP 10 illustrated in FIG. 2. The basic configuration illustrated in FIG. 2 is explained below.

The SVP 10 is connected to a plurality of LSIs 20 via an SMBus 11 (hereinafter referred to as SMBus #0), which is a serial bus. The SMBus #0 corresponds to the signal line 6 illustrated in FIG. 1. Each of the LSIs 20 includes a plurality of SMBus Ctrls 21, a Reg 22, and an SMB transfer circuit 23. Reference numeral 21 in FIG. 2 representatively denotes an SMBus Ctrl #0, SMBus Ctrl #1, SMBus Ctrl #2, and SMBus Ctrl #3. The SMBus Ctrls #n (n represents integers 0 to 3) of the LSI 20 are connected to SMBus Ctrls #n of the other LSIs 20.

The SMBus Ctrl 21 transmits a response signal to the SVP 10 via the SMBus 11, and receives a control signal transmitted from the SVP 10. For example, the SMBus Ctrl #0 receives a control signal including a control command transmitted from the SVP 10, and transmits a response signal to the SVP 10 via the SMBus #0. The SMBus Ctrl #1, the SMBus Ctrl #2, and the SMBus Ctrl #3 are connected to the SMBus Ctrls 21 of the other LSIs 20 via the SMBuses (SMBuses #1 to #6) corresponding to the SMBus Ctrl #1, the SMBus Ctrl #2, and the SMBus Ctrl #3, and can perform transmission and reception of serial data between the LSI 20 and the other LSIs 20.

The Reg 22 is a control register that performs setting of various kinds of control, and performs reading control information and the like in the LSI 20. The Reg 22 includes a register for indirect access, which is a register that performs the control setting for transferring the control command to the other LSIs 20. The SMB transfer circuit 23 has a function of performing transfer setting of the control command received from the SMBus Ctrl 21 to the other LSIs 20. An SMB transfer circuit may include the Reg 22.

The information processing apparatus has the configuration illustrated in FIG. 2, so that, when the SVP 10 transmits a control command to one LSI 20 of a transmission destination, the SVP 10 can instruct a transfer of the control command to the LSI 20 of the transmission destination via the other LSIs 20. The SVP 10 can also instruct, with one LSI 20 set as a start point, a transfer of the control command to the other all LSIs 20.

The SVP 10 includes, as illustrated in FIG. 3, an abnormality determining unit 100, a control signal transmitting unit 101, and a response signal receiving unit 102. The control signal transmitting unit 101 transmits a control signal including a control command to the LSI 20, which is set as a transmission target of the control signal by the SVP 10. The response signal receiving unit 102 receives a response signal to the control command transmitted from the SMBus Ctrl 21 of the LSI 20. The abnormality determining unit 100 determines whether abnormality occurs in access to the LSI 20. Specifically, the abnormality determining unit 100 determines whether a response signal to the control signal is not transmitted from the SMBus Ctrl 21 of the LSI 20 or, even when a response signal is transmitted, whether the signal is abnormal. When the abnormality determining unit 100 determines that a response signal to the control signal is not transmitted from the SMBus Ctrl 21 of the LSI 20 or the response signal indicates abnormality, the abnormality determining unit 100 determines that abnormality occurs in access to the LSI 20.

A correspondence relation between the information processing apparatus illustrated in FIG. 1 and the configurations illustrated in FIGS. 2 and 3 is explained. The functional units of the LSI 20 illustrated in FIG. 2 correspond to the unit of the control circuit 2 illustrated in FIG. 1. Specifically, the Reg 22 and the SMB transfer circuit 23 correspond to the control setting unit 3 and the SMBus Ctrl #0 corresponds to the signal transmitting and receiving unit 4. The SMBus Ctrls #1 to #3 and the SMB transfer circuit 23 correspond to the signal transfer unit 5. The SVP 10 illustrated in FIGS. 2 and 3 corresponds to the system control apparatus 1 illustrated in FIG. 1.

Figure 4:
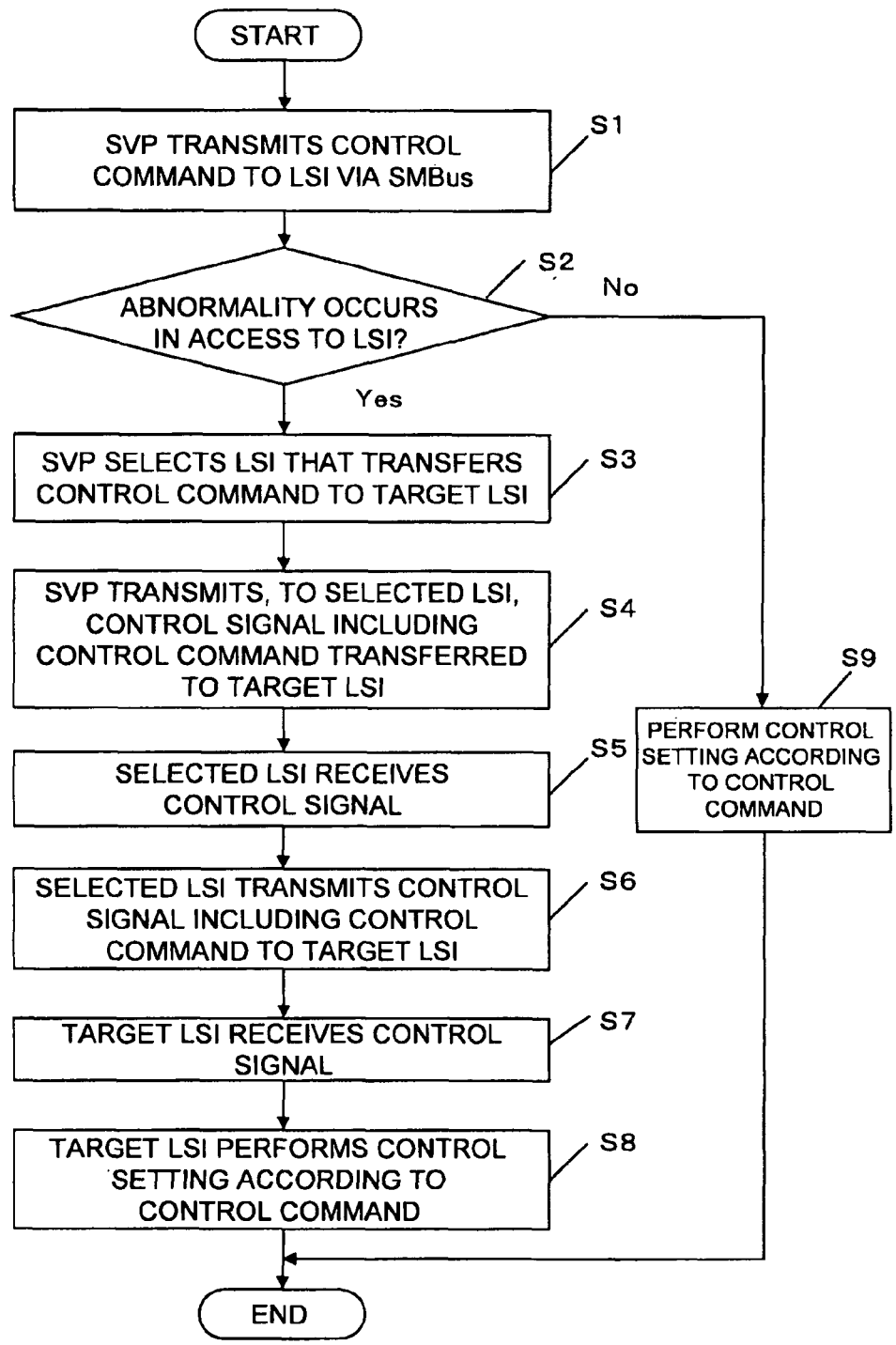
FIG. 4 is a diagram illustrating a processing flow of the first embodiment of the information processing apparatus.

FIG. 4 is a diagram illustrating a processing flow of the first embodiment of the information processing apparatus. When the SVP 10 starts a control processing on each of the LSIs 20, the SVP 10 transmits a control command to the LSI 20 via the SMBus 11 (step S1). Subsequently, the SVP 10 determines whether abnormality occurs in access to the LSI 20 (step S2). When the SVP 10 determines that abnormality occurs in the access to the LSI 20, the SVP 10 selects the LSI 20 that transfers the control command to this LSI (hereinafter, target LSI) 20 (step S3). When the SVP 10 determines that the access to the LSI 20 is normal, the LSI 20 performs control setting according to the control command transmitted from the SVP 10 (step S9).

Subsequently, the SVP 10 transmits a control signal including the control command, which is transferred to the target LSI 20, to the selected LSI 20 (step S4). The LSI 20 selected by the SVP 10 receives the control signal including the control command (step S5). The LSI 20 selected by the SVP 10 transmits the control signal including the control command to the target LSI 20 via the SMBus 11 (step S6). The target LSI 20 receives the control signal including the control command from the selected LSI 20 (step S7). The target LSI 20 performs control setting according to the control command included in the received control signal (step S8).

Figure 5:
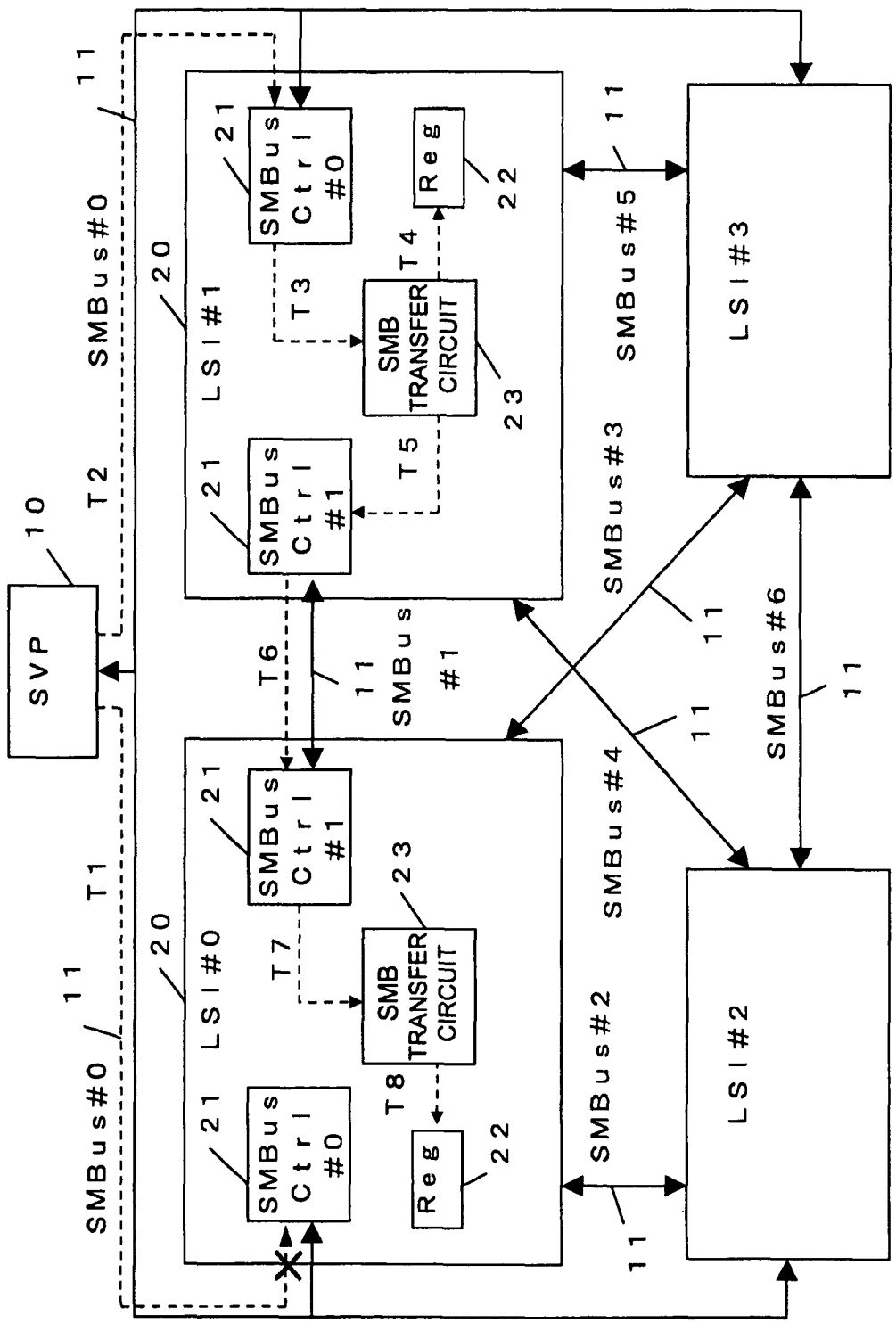
FIG. 5 is a diagram illustrating the operation of the first embodiment of the information processing apparatus.

FIG. 5 is a diagram illustrating the operation of the first embodiment of the information processing apparatus. A system configuration illustrated in FIG. 5 is the same as the configuration illustrated in FIG. 2. The functional units not directly related to the explanation of the operation are not illustrated in FIG. 5. FIG. 5 illustrates an operation example in a case that, when the SVP 10 detects abnormality in access to the LSI #0, the SVP 10 transmits a control command for performing a control setting on the LSI #0 to the LSI #1, and the LSI #1 transfers the control command to the LSI #0. In the following explanation, broken arrows T (T1 to T8) in figures indicate transition states of the operation.

Although the SVP 10 transmits a control signal including the control command to the LSI #0 via the SMBus #0 in order to perform the control setting on the LSI #0, the LSI #0 cannot transmit a response signal to the control signal (T1). The LSI #0 cannot transmit a response signal to the control signal, for example, when a failure occurs in the SMBus Ctrl #0, or when connection abnormality or the like of the signal line between the SMBus #0 and the LSI #0 occurs.

Since a response signal cannot be received from the LSI #0, the abnormality determining unit 100 of the SVP 10 detects response abnormality of the LSI #0, and determines that the control setting cannot be directly performed on the LSI #0 via the SMBus #0. Subsequently, the abnormality determining unit 100 instructs the control signal transmitting unit 101 to transmit the control signal including the control command, which should be transferred to the LSI #0, to another LSI 20 (e.g., the LSI #1). The control signal transmitting unit 101 transmits the control signal to the LSI #1 via the SMBus #0 (T2).

Subsequently, the SMBus Ctrl #0 of the LSI #1 that receives the control signal extracts the control command included in the control signal, and sends the control command to the SMB transfer circuit 23 (T3). The SMB transfer circuit 23 sends the control command to the Reg 22 (T4).

Subsequently, the SMB transfer circuit 23 instructs the SMBus Ctrl #1 to transfer the control command to the LSI #0 (T5). The SMBus Ctrl #1 that receives the instruction of the SMB transfer circuit 23 transfers the control signal including the control command to the SMBus Ctrl #1 of the LSI #0 via the SMBus #1 (T6). In other words, the SMBus Ctrl #1 of the LSI #1 is signal transfer unit, and transfers, via the SMBus #1, which is the serial bus, the control command included in the control signal, which is transmitted from the control signal transmitting unit 101 of the SVP 10, to the LSI #0, which is the control circuit in which it is determined that the abnormality occurs. The SMBus Ctrl #1 of the LSI #0 receives the transferred control signal including the control command, extracts the control command from the received control signal, and sends the control command to the SMB transfer circuit 23 (T7). The SMB transfer circuit 23 sends the control command to the Reg 22 (T8), and performs the control setting for the LSI #0 according to the control command.

The SVP 10 may transfer the control command to the LSI #0 via the LSI #2 or the LSI #3.

When the SVP 10 included in the information processing apparatus detects the LSI 20 having access abnormality on the serial bus, the SVP 10 transmits the control command to the target LSI 20 (in FIG. 5, the LSI #0), which is the control setting target, via any one of the LSIs 20 that can transmit the control command. Consequently, the SVP 10 can transfer the control command to the LSI 20 in which the access abnormality occurs and perform the control setting. As a result, it is possible to prevent a serious failure from occurring in the information processing apparatus and the reliability of the information processing apparatus is improved.

Figure 6:
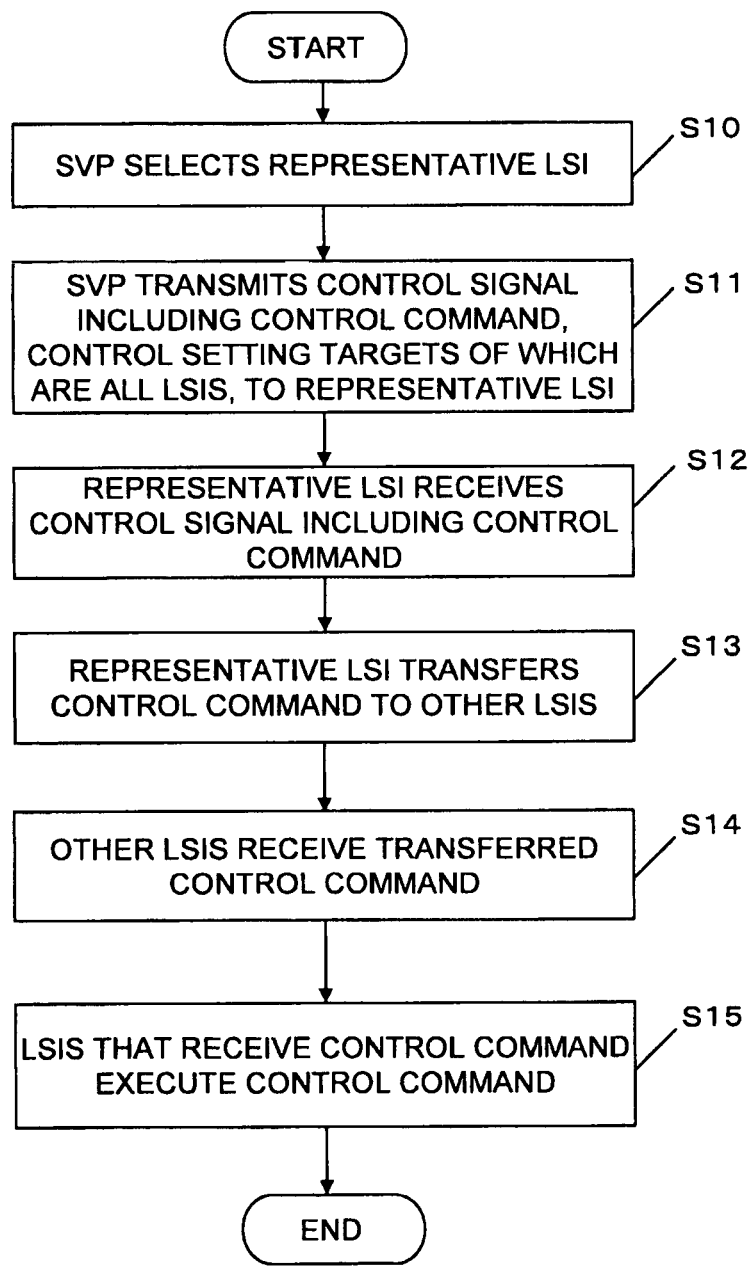
FIG. 6 is a diagram illustrating a processing flow of the second embodiment of the information processing apparatus.

FIG. 6 is a diagram illustrating a processing flow of a second embodiment of the information processing apparatus. When the SVP 10 performs the control setting of the same content to the LSIs 20, the SVP 10 starts broadcast transfer processing explained later. The broadcast transfer processing is processing in which the SVP 10 transmits a control command for performing control setting of the same content to all the LSIs 20 via the representative LSI 20. First, the SVP 10 selects one representative LSI 20 among the plurality of LSIs 20 (step S10). The SVP 10 transmits, after selecting the representative LSI 20, a control signal including a control command, control setting targets of which are all the LSIs 20, to the representative LSI 20 (step S11). The representative LSI 20 receives the transmitted control signal including the control command (step S12).

Subsequently, the representative LSI 20 transfers the control command included in the control signal to the other LSIs 20 according to the received control signal (step S13). The other LSIs 20 receive the transferred control command (step S14). The LSIs 20 execute the control command (step S15). Specifically, the representative LSI 20 executes control setting for the representative LSI 20 according to the control command included in the control signal received in step S12. The other LSIs 20 executes control setting for the own LSIs according to the control command received in step S14.

Figure 7:
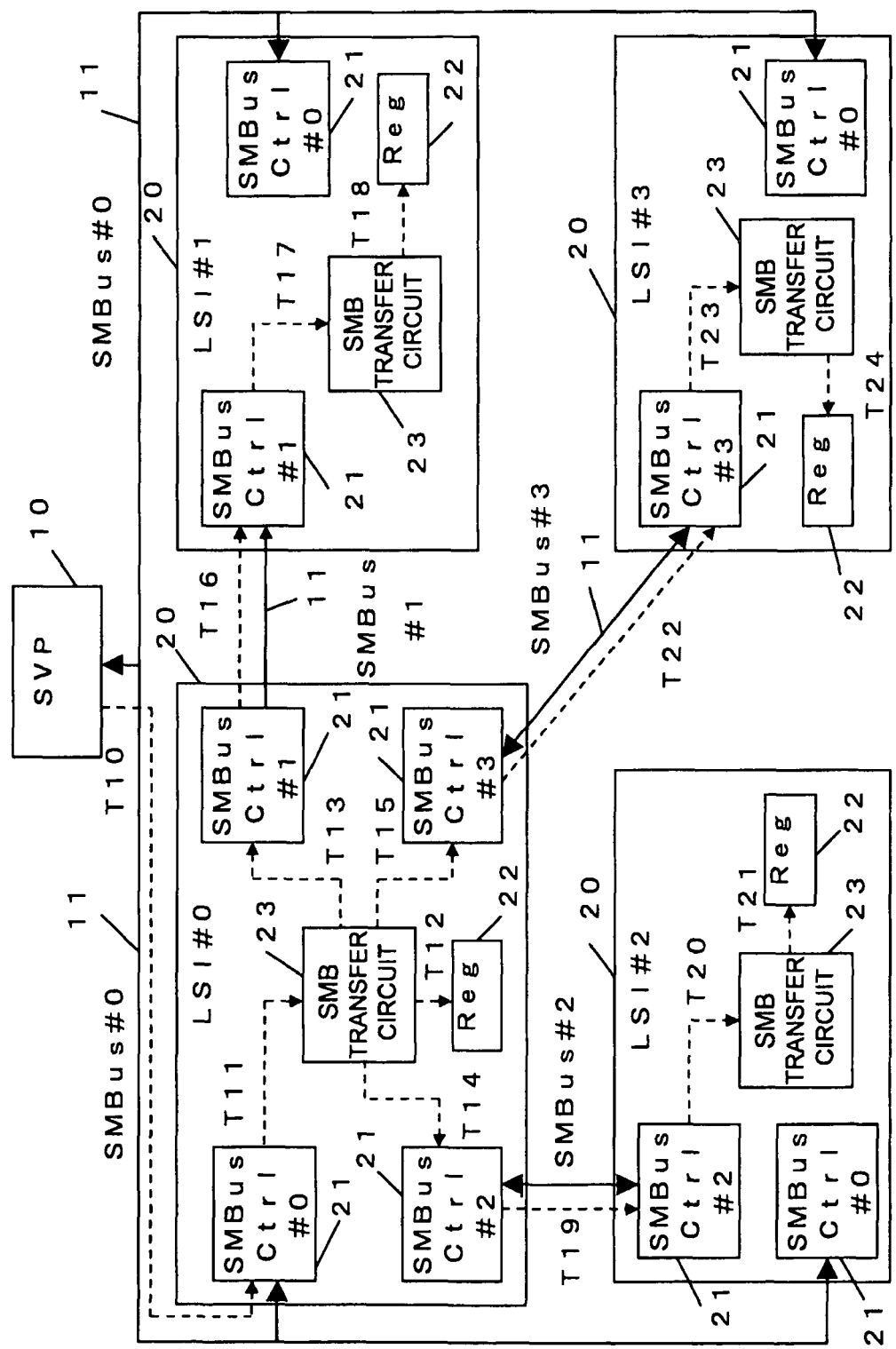
FIG. 7 is a diagram illustrating the operation of the second embodiment of the information processing apparatus.

FIG. 7 is a diagram illustrating the operation of the second embodiment of the information processing apparatus. A system configuration illustrated in FIG. 7 is the same as the configuration illustrated in FIG. 2. In the explanation of the operation, the functional units not directly related to the explanation are not illustrated in FIG. 7. An example in which the SVP 10 transmits a control command to the LSI #0, and instructs the LSI #0 to transfer (broadcast transfer) the control command to the other all LSIs 20 is explained below with reference to FIG. 7.

The SVP 10 selects, for example, the LSI #0 as the representative LSI 20. The control signal transmitting unit 101 (refer to FIG. 3) of the SVP 10 transmits a control signal including a control command, control setting targets of which are all the LSIs 20 illustrated in FIG. 7, to the LSI #0, and instructs the LSI #0 to perform broadcast transfer of the control command. The SMBus Ctrl #0, which is the signal transmitting and receiving unit included in the LSI #0, receives the control signal including the control command (T10). Subsequently, the SMB transfer circuit 23, which is the signal transfer unit included in the LSI #0, receives the control signal including the control command from the SMBus Ctrl #0 (T11). The SMB transfer circuit 23 sends the control command concerning the control setting for the own LSI 20 included in the received control signal to the Reg 22 (T12). The SMB transfer circuit 23 executes control processing for transferring the control command to all the LSIs 20, which are targets of the broadcast transfer. Specifically, in order to transfer the control command to the other LSIs 20 other than the own LSI 20, the SMB transfer circuit 23 sends the control command to the SMBus Ctrls #1 to #3 (T13, T14, and T15).

Subsequently, the SMBus Ctrls #1, #2, and #3 transfer the control signal including the control command respectively to the LSI #1, the LSI #2, and the LSI #3 via the SMBus #1, the SMBus #2, and the SMBus #3 (T16, T19, and T22). The SMBus Ctrls 21 of the LSIs 20 that receive the control signal send the control signal including the control command to the SMB transfer circuits 23 (T17, T20, and T23).

Subsequently, the SMB transfer circuits 23 send the control command included in the received control signal to the Regs 22 (T18, T21, and T24). The Regs 22 perform control setting for the own LSIs 20 according to the control command sent from the SMB transfer circuit 23.

As explained with reference to FIG. 7, when the SVP 10 performs the control setting of the same content on all the LSIs 20, the SVP 10 transmits the control command for broadcast to the selected representative LSI 20. The representative LSI 20 transfers the control command to the other all LSIs 20 other than the own LSI 20. Therefore, with the information processing apparatus, when the SVP 10 performs the control setting of the same content on all the LSIs 20, the SVP 10 does not need to transmit the control command individually to the respective LSIs 20. As a result, it is possible to reduce a load on the SVP 10.

Figure 8:
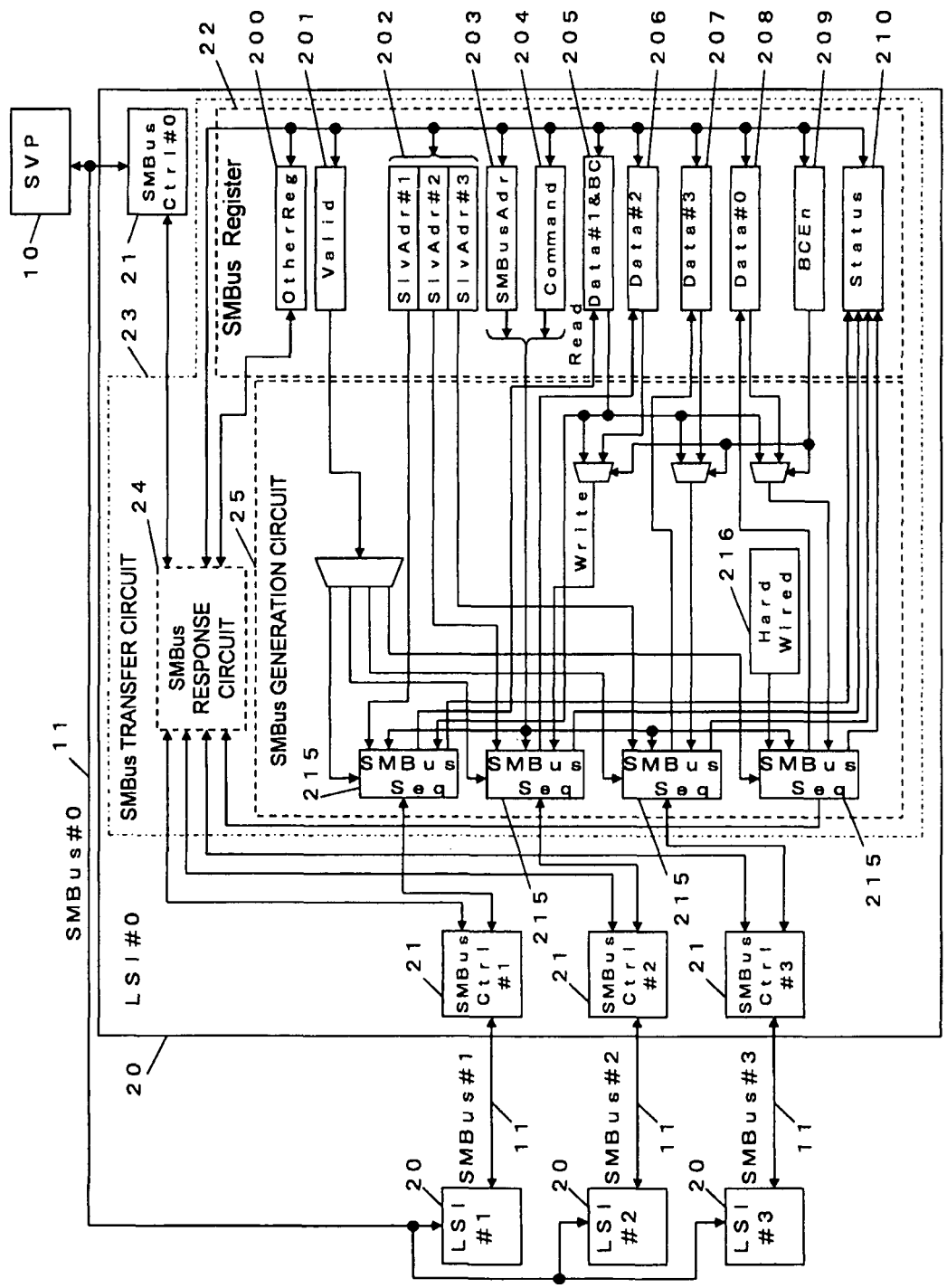
FIG. 8 is a diagram illustrating an example of a detailed circuit configuration of a control circuit.

FIG. 8 is a diagram illustrating an example of a detailed circuit configuration of the LSI 20 explained above with reference to FIG. 2. The LSI 20 includes the SMBus Ctrls 21, the Reg (e.g., SMBus Register) 22, and the SMBus transfer circuit 23. The SMBus transfer circuit 23 includes an SMBus response circuit 24 and an SMBus generation circuit 25. A detailed configuration of the SMBus transfer circuit 23 is explained below.

The SMBus response circuit 24 is a processing unit that accesses the SMBus Register 22. Specifically, since the LSI 20 includes the plurality of SMBus Ctrls 21, the SMBus response circuit 24 selects the SMBus Ctrl 21 such that access from the SMBus Ctrls 21 does not conflict with the SMBus Register 22, and controls data transmission and reception to and from the selected SMBus Ctrl 21.

The SMBus generation circuit 25 includes an SMBus Seq 215, a Hard Wired 216, and a plurality of logic circuits. An internal configuration of the SMBus generation circuit 25 is explained below.

The SMBus Seq 215 is a functional unit (a functional unit for a transfer sequence) that transmits, and receives transfer data to and from the SMBus Ctrl 21. The SMBus Ctrl 21 can perform reading in a corresponding register of the SMBus Register 22 via the SMBus Seq 215. On the other hand, writing from the SMBus Ctrl 21 to the SMBus Register 22 is performed via the SMBus response circuit 24.

The Hard Wired 216 is a hard wired that determines an address of the own LSI 20. The SMBus Register 22 includes a plurality of registers, i.e., an Other Reg 200, a Valid 201, a Slave (Slv) Adr 202, an SMBus Adr 203, a Command 204, a Data 205, a Data 206, a Data 207, a Data 208, a BCEn 209, and a Status 210. The Data 205 indicates Data #1 & BC, the Data 206 indicates Data #2, the Data 207 indicates Data #3, and the Data 208 indicates Data #0. The valid 201, the Slave Adr 202, the SMBus Adr 203, the Command 204, the Data 205, the Data 206, the Data 207, the Data 208, the BCEn 209, and the Status 210 are registers for indirect access, which are registers that perform control setting for transferring a control command received from the SMBus Ctrl 21 to the other LSIs 20. The Other Reg 200 is a register that performs the control setting on the LSI #0 itself.

The Valid 201 is a register that performs setting for issuing an SMBus command to the LSI 20 of a connection destination when 1 is set in a bit (Valid Bit) corresponding to the LSI of the connection destination.

Before setting "1" in the bit corresponding to the LSI 20 of the connection destination (specifically, setting for enabling the SMBus Seq 215), the SMBus Register 22 sets registers such as the Slave Adr 202, the SMBus Adr 203, the Command 204, the Data #1 & BC, the Data #2, the Data #3, the Data #0, and the BCEn 209. When "0" is written in the bit corresponding to the LSI 20 of the connection destination of the Valid 201, the SMBus Seq 215 is reset.

The Slave Adr 202 is a register that sets slave addresses (addresses for identifying the LSIs #1, #2, and #3) of the LSIs 20 connected to the destinations of the SMBus #1, #2, and #3. The SMBus Adr 203 sets SMBus addresses of the LSIs 20 to which the LSI 20 accesses (addresses allocated to the registers in the LSIs 20). The Command 204 is a register that sets a command for the registers of the LSIs (LSIs #0 to #3) to be accessed.

The Data #1 & BC 205 is a register for indirect access corresponding to the SMBus #1, in other words, a register used for command transfer to the LSI #1. The Data #1 & BC 205 is also a register for broadcast transfer, in other words, a register used for command transfer to all the LSIs 20. When the access to the registers in the LSI 20 (the LSI #1 or all the LSIs 20), which is a control setting target, is writing, the SMBus Register 22 writes data in the Data #1 & BC 205. When the access to the registers is reading, the SMBus Register 22 stores read data in the Data #1 & BC 205. In particular, when write (broadcast write) in all the LSIs 20 by the broadcast transfer is performed, the Data #1 & BC 205 passes data written in the Data #1 & BC 205 to the SMBus generation circuit 25.

The Data #2 is a register for indirect access corresponding to the SMBus #2. The Data #3 is a register for indirect access corresponding to the SMBus #3. When access to the registers of the LSI #2 and the registers of the LSI #3 is writing, the SMBus Register 22 writes data respectively in the Data #2 and the Data #3. When the access to the registers of the LSI #2 and the registers of the LSI #3 is reading, the SMBus Register 22 stores read data respectively in the Data #2 and the Data #3.

When the broadcast write is performed, the SMBus Register 22 does not write data in the Data #2 and the Data #3. When data is read from the other LSIs 20 via the SMBuses #2 and #3, the SMBus Register 22 stores the read data in the Data #2 and the Data #3.

The Data #0 is a register for indirect access to the own LSI 20. The BCEn 209 is a register that performs broadcast setting that is setting for writing data in or reading data from the same register of the same address in the plurality of LSIs 20 having registers of the same SMBus address. When the control signal included in the control command from the SVP 10 indicates the broadcast setting, the SMBus Register 22 sets a corresponding bit of the BCEn 209 to "1" (Enable).

The Status 210 is a register representing an indirect access state (a state of access to the own LSI 20 and the other LSIs 20). The Status 210 stores a state of "success", "in-access", or "failure". The LSI 20 checks whether indirect access is successful referring to this register. Only when accessing the SMBus Ctrls (#0 to #3), the LSI 20 can access the register for indirect access.

A first operation example of the LSI 20 illustrated in FIG. 8 is explained below. When access abnormality does not occur on the SMBus #0, the SVP 10 accesses the registers of the LSIs 20 via the SMBus #0 illustrated in FIG. 8. When the registers of the LSIs 20 is inaccessible via the SMBus #0, the LSI 20 executes operations explained below.

(1-1) When the circuit of the LSI #1 breaks down and the LSI #1 is inaccessible via the SMBus #0, the SVP 10 detects timeamong a response from the LSI #1 or an error of a transmission code. In this case, after retrying access to the LSI #1 a predetermined number of times, when the LSI #1 is inaccessible, the SVP 10 determines that access abnormality or a failure occurs in the LSI #1.

(1-2) The SVP 10 performs the processing explained below in order to indirectly access the LSI #1 via the LSI #0. The SVP 10 writes a slave address of the LSI #1 to the Sly Adr #1 in the Slave Adr 202 of the LSI #0. Subsequently, the SVP 10 writes an SMBus address of a register of the LSI #1 (an address allocated to the register), which the SVP 10 desires to access, in the SMBus Adr 203 of the LSI #0. In this embodiment, the access to the register of the LSI 20 is referred to as SMBus access. The SVP 10 writes an access type "Read" (reading of data) or "Write" (writing of data) in the Command 204 of the LSI #0. When the access type is "Write", the SVP 10 writes data in the Data #1 of the LSI #0. The SVP 10 writes "1" in a bit of the Valid 201 corresponding to the SMBus Ctrl #1 connected to the LSI #0 and the LSI #1.

(1-3) The LSI #0 issues an SMBus command (transmits an SMBus command to the LSI #1) via the SMBus Ctrl #1.

(1-4) The LSI #0 stores a state of an executed SMBus operation (an operation for issuing the SMBus command) in the Status 210 of the LSI #0.

(1-5) The SVP 10 reads the Status 210, and checks success or failure of the access. When the Status 210 maintains a state of in-access, the SVP 10 performs access again after waiting for a predetermined time. When the Status 210 still maintains the state of in-access after the SVP 10 retries a predetermined number of times, the SVP 10 determines that the access ends in failure.

The LSI #1, to which the SMBus command is transmitted from the LSI #0, performs the control setting on the LSI #1 by setting the Other Reg 200 via the SMBus Ctrl and the SMBus response circuit in the LSI #1 according to the SMBus command.

A second operation example of the LSI 20 illustrated in FIG. 8 is explained below. When the SVP 10 sets the same value in the same SMBus address in the LSIs #0 to #3, the SVP 10 performs the broadcast transfer with the LSI #0 set as the representative LSI 20 as explained below.

(2-1) The SVP 10 performs processing explained below to the register for indirect access of the LSI #0 via the SMBus #0. The SVP 10 writes the slave addresses of the LSIs #1, #2, and #3 respectively in the Slv Adrs #1, #2, and #3 of the LSI #0. Subsequently, the SVP 10 writes SMBus addresses of registers as access targets in all the LSIs, which the SVP 10 desires to access, in the SMBus Adr 203 of the LSI #0. The SVP 10 writes the access type ("Read" or "Write") in the Command 204 of the LSI #0. When the access type is "Write", the SVP 10 writes data in the Data #1 of the LSI #0. Subsequently, the SVP 10 writes "1" in the BCEn 209 of the LSI #0. The SVP 10 writes "1" in a bit of the Valid 201 corresponding to the SMBus Ctrls 21 respectively connected to the LSIs #1, #2, and #3 of the LSI #0.

(2-2) The representative LSI 20 (LSI #0) issues an SMBus command to the other all LSIs 20 via the SMBus Ctrls #1, #2, and #3. In the same manner as the LSI #0 accessing the registers of the other LSIs 20, the SVP 10 accesses the registers in the LSI #0, and performs the control setting on the LSI #0.

(2-3) The LSI #0 stores a state of the SMBus operation after the issuance of the SMBus command in the Status 210 of the LSI #0.

(2-4) The SVP 10 reads the Status 210, and checks success or failure of the access. When the Status 210 maintains a state of in-access, the SVP 10 performs access again after waiting for a predetermined time. When the Status 210 still maintains the state of in-access after the SVP 10 retries a predetermined number of times, the SVP 10 determines that the access ends in failure.

Figure 9:
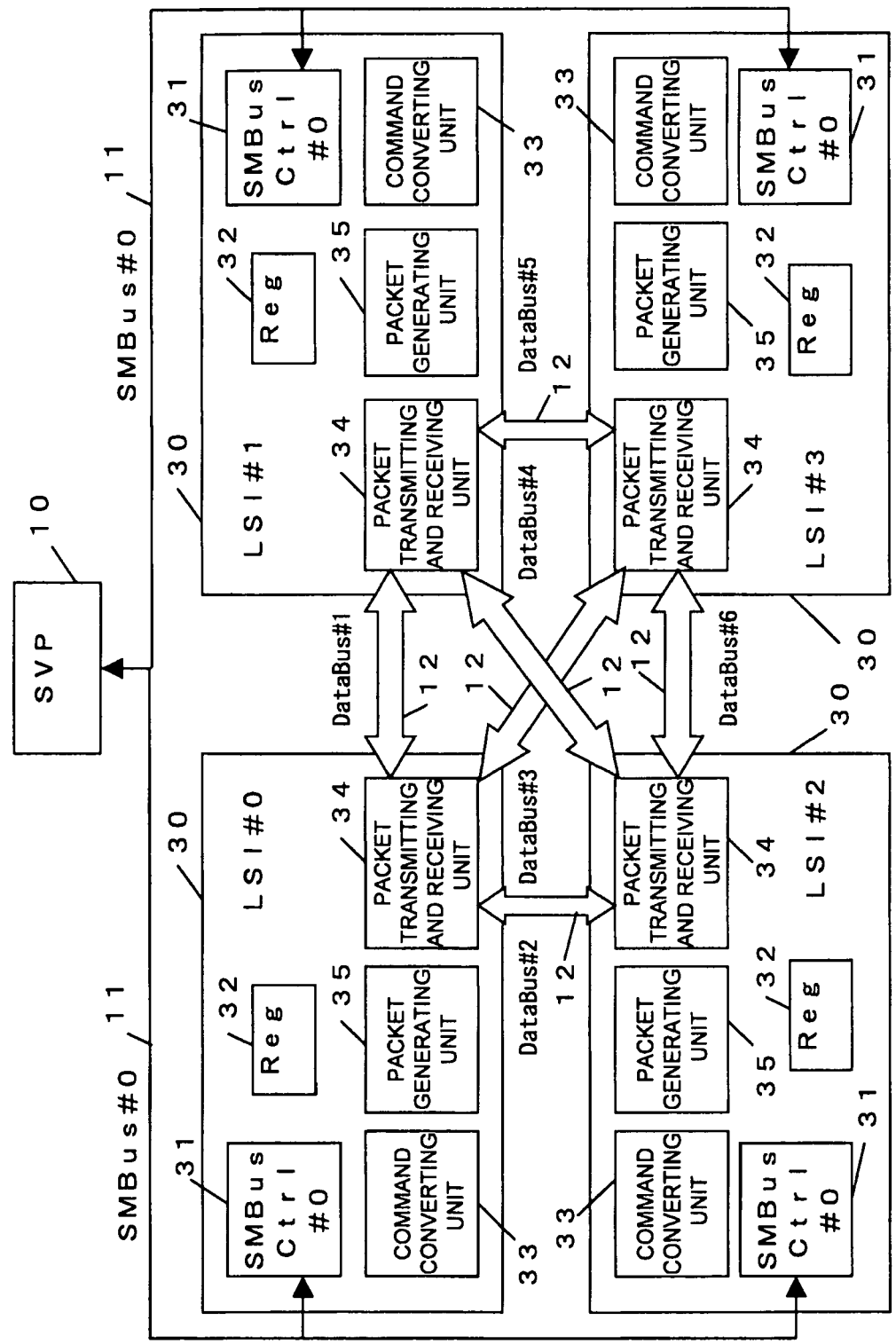
FIG. 9 is a diagram illustrating a basic configuration of a third embodiment and a fourth embodiment of the information processing apparatus.

FIG. 9 is a diagram illustrating a basic configuration of a third embodiment and a fourth embodiment of the information processing apparatus. A basic configuration of the SVP 10 is the same as the configuration illustrated in FIG. 3.

The SVP 10 is connected to a plurality of LSIs 30 via the SMBus 11 (hereinafter also referred to as SMBus #0), which is a serial bus. Each of the LSIs 30 includes a plurality of SMBus Ctrls 31 (also referred to as SMBus Ctrls #0), a Reg 32, a command converting unit 33, a packet transmitting and receiving unit 34, and a packet generating unit 35.

The SMBus Ctrl #0 has the function of the signal transmitting and receiving unit 4 illustrated in FIG. 1 explained above. Specifically, the SMBus Ctrl #0 receives a control signal including a control command transmitted from the SVP 10, and transmits a response signal or the like to the SVP 10 via the SMBus #0. The Reg 32 is a control register that performs setting of various kinds of control, and performs reading control information and the like in the LSI 30. The Reg 32 includes a register for indirect access, and is a register that performs a control setting for transferring the control command to the other LSIs 30. The command converting unit 33 converts packet data including a control command received by the packet transmitting and receiving unit 34 into a control command (extracts the control command from the packet data), sends the control command to the Reg 32, and performs the control setting on the LSI 30.

The packet transmitting and receiving unit 34 performs transmission and reception of packet data to and from the packet transmitting and receiving unit 34 in the other LSIs 30 via Data Buses 12 (Data Buses #1 to #6). The Data Buses 12 are data buses for packet data to be processed in the LSIs 30. The packet generating unit 35 generates, based on a control signal received by the SMBus Ctrl #0 from the SVP 10 via the SMBus #0, packet data including a control command of the control signal, and sends the packet data to the packet transmitting and receiving unit 34.

The information processing apparatus adopts the configuration illustrated in FIG. 9, whereby, when the SVP 10 transmits a control command to one LSI 30 of a transmission destination, the SVP 10 can instruct transfer of the control command to the LSI 30 of the transmission destination via the other LSIs 30. The SVP 10 can also instruct transfer of the control command from one LSI 30 to the other all LSIs 30.

A correspondence relation between the units included in the information processing apparatus explained with reference to in FIG. 1 and the processing units illustrated in FIG. 9 is explained. The processing units of the LSI 30 illustrated in FIG. 9 correspond to the units of the control circuit 2 illustrated in FIG. 1. Specifically, the Reg 32 and the command converting unit 33 correspond to the control setting unit 3 and the SMBus Ctrl #0 corresponds to the signal transmitting and receiving unit 4. The command converting unit 33, the packet transmitting and receiving unit 34, and the packet generating unit 35 correspond to the signal transfer unit 5. The SVP 10 illustrated in FIG. 9 corresponds to the system control apparatus 1 illustrated in FIG. 1.

Figure 10:
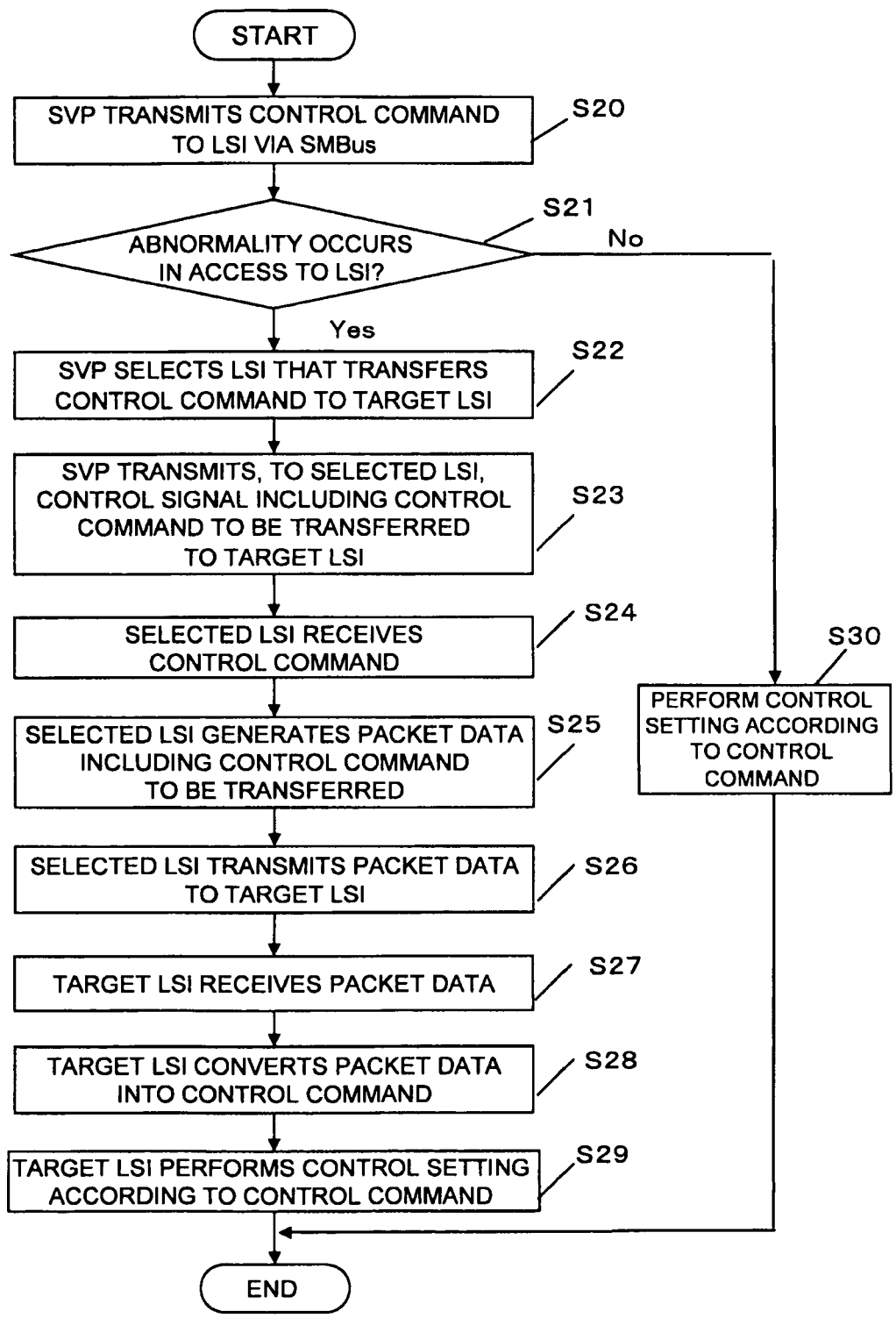
FIG. 10 is a diagram illustrating a processing flow of the third embodiment of the information processing apparatus.

FIG. 10 is a diagram illustrating a processing flow of the third embodiment of the information processing apparatus. When the SVP 10 starts a control processing on the LSI 30, the SVP 10 transmits a control command to the LSI 30 via the SMBus 11 (step S20). Subsequently, the SVP 10 determines whether abnormality occurs in access to the LSI 30 (step S21). When the SVP 10 determines that abnormality occurs in the access to the LSI 30, the SVP 10 selects the LSI 30 that transmits the control command to this LSI (hereinafter target LSI) 30 (step S22). When the SVP 10 determines that the access to the LSI 30 is normal, the LSI 30 performs control setting according to the control command transmitted from the SVP 10 (step S30).

Subsequently, the SVP 10 transmits a control signal including the control command, which is transferred to the target LSI 30, to the selected LSI 30 (step S23). The LSI 30 selected by the SVP 10 receives the control command transmitted from the SVP 10 (step S24). Subsequently, the LSI 30 selected by the SVP 10 generates packet data including the control command transferred to the target LSI 30 (step S25), and transmits the packet data to the target LSI 30 via the Data Bus 12 (step S26).

Subsequently, the target LSI 30 receives the packet data via the Data Bus 12 (step S27). Subsequently, the target LSI 30 converts the packet data into a control command (step S28). The target LSI 30 performs control setting according to the control command (step S29).

Figure 11:
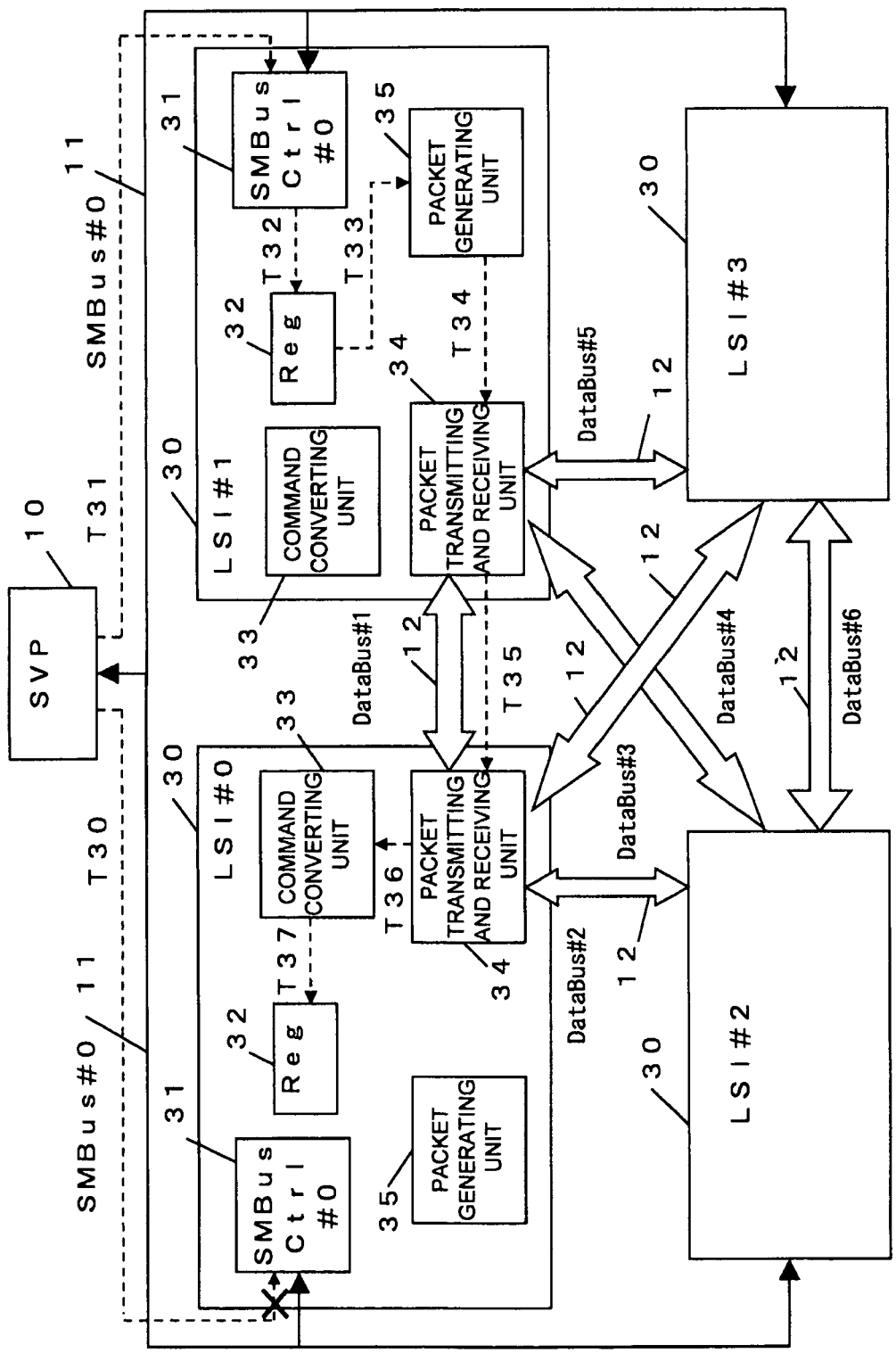
FIG. 11 is a diagram illustrating the operation of the third embodiment of the information processing apparatus.

FIG. 11 is a diagram illustrating an operation of the third embodiment of the information processing apparatus. A basic configuration illustrated in FIG. 11 is the same as the configuration illustrated in FIG. 9. In FIG. 11, a processing in which the SVP 10 detects access abnormality of the LSI #0, and transmits a control command for the LSI #0 to the LSI #1 and the LSI #1 transfers the control command to the LSI #0 is explained as an example.

The SVP 10 transmits a control signal including a control command to the LSI #0 via the SMBus #0 in order to perform the control setting on the LSI #0, but the LSI #0 cannot transmit a response signal to the signal (T30). Since a response signal cannot be received from the LSI #0, the abnormality determining unit 100 of the SVP 10 detects response abnormality of the LSI #0, and determines that the control setting cannot be directly performed on the LSI #0 via the SMBus #0. Subsequently, the abnormality determining unit 100 instructs the control signal transmitting unit 101 to transmit the control signal including the control command for performing the control setting on the LSI #0 to another LSI 30 (for example, the LSI #1). The control signal transmitting unit 101 transmits the control signal to the LSI #1 via the SMBus #0 (T31). The control signal includes information indicating that the control command is transferred to the LSI #0. Subsequently, The SMBus Ctrl #0 of the LSI #1 that receives the control signal sends the received control signal to the Reg 32 (T32). The Reg 32 sends the control command included in the control signal to the packet generating unit 35 (T33). Subsequently, the packet generating unit 35 generates packet data including the control command received from the Reg 32, and sends the packet data to the packet transmitting and receiving unit 34 (T34). The packet transmitting and receiving unit 34 receives the packet data from the packet generating unit 35, and transmits the packet data to the LSI #0 via the Data Bus #1 (T35). In other words, the packet transmitting and receiving unit 34 is a signal transfer unit that transfers, via the Data Bus #1, the packet data generated by the packet generating unit 35 to the control circuit (LSI #0) in which it is determined that abnormality occurs.

Subsequently, the packet transmitting and receiving unit 34 of the LSI #0 receives the packet data from the LSI #1, and sends the packet data to the command converting unit 33 (T36). The command converting unit 33 converts the packet data into a control command, sends the control command to Reg 32, and performs the control setting for the LSI #0 (T37). In other words, the command converting unit 33 is a command converting unit that converts packet data transferred from another control circuit (the LSI #1) other than the own control circuit (the LSI #0) into a command used for control setting for the own control circuit.

As explained with reference to FIG. 11, in the information processing apparatus, the SVP 10 detects the LSI 30 having access abnormality on the serial bus. And, the SVP 10 transfers a control command for performing the control setting on the LSI 30 having the access abnormality to the LSI 30 having the access abnormality, via another LSI 30 and a data bus between the LSIs 30. Therefore, with the information processing apparatus, the SVP 10 can transfer the control command to the LSI 30 in which the access abnormality occurs and perform the control setting. As a result, it is possible to prevent a serious failure from occurring in the information processing apparatus and the reliability of the information processing apparatus is improved.

Figure 12:
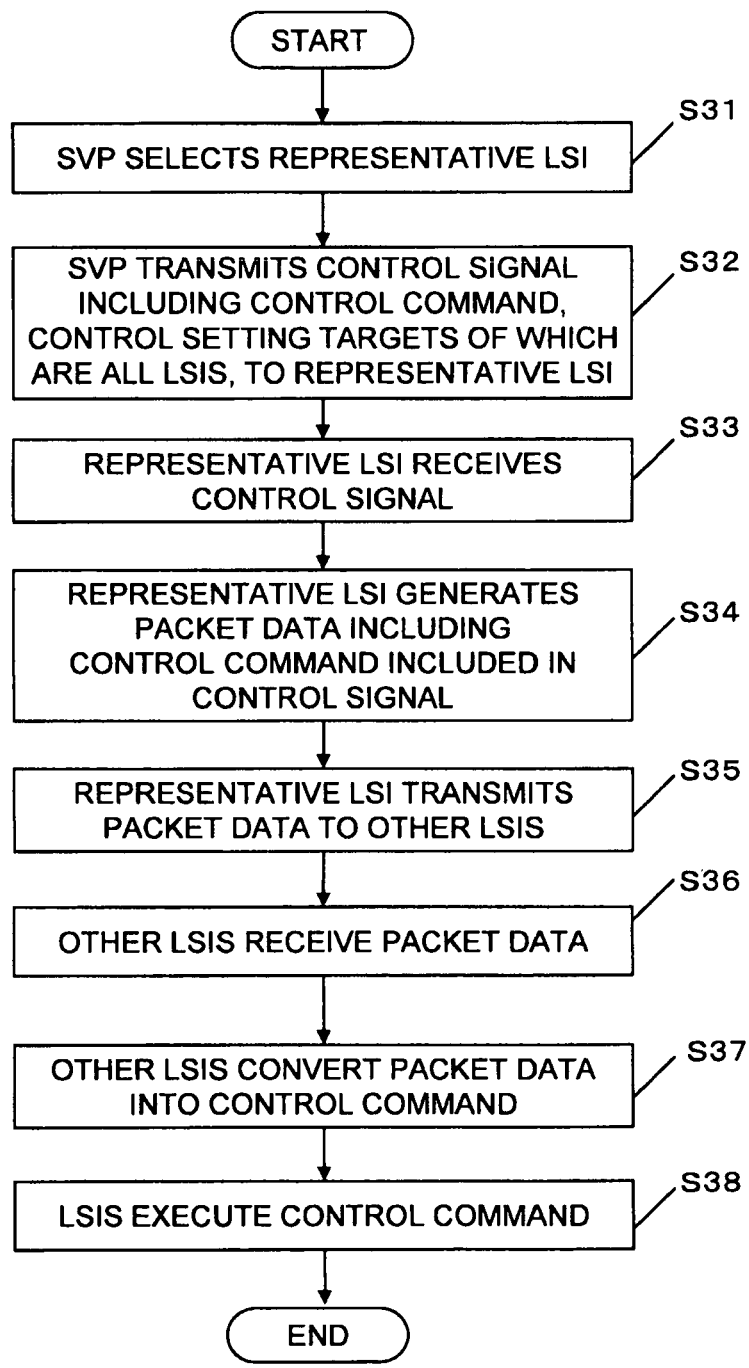
FIG. 12 is a diagram illustrating a processing flow of the fourth embodiment of the information processing apparatus.

FIG. 12 is a diagram illustrating a processing flow of the fourth embodiment of the information processing apparatus. When the SVP 10 performs the control setting of the same content on the LSIs 30, the SVP 10 starts broadcast transfer processing explained below. First, the SVP 10 selects one representative LSI 30 among the plurality of LSIs 30 (step S31). The SVP 10 transmits, after selecting the representative LSI 30, a control signal including a control command, control setting targets of which are all the LSIs 30, to the representative LSI 30 (step S32). The representative LSI 30 receives the transmitted control signal including the control command (step S33).

Subsequently, the representative LSI 30 generates packet data including the control command included in the received control signal (step S34). The representative LSI 30 transmits the packet data to the other LSIs 30 via the Data Bus 12 (step S35). Subsequently, the other LSIs receive the packet data (step S36), and convert the packet data into control commands (step S37). The LSIs 30 executes the control commands (step S38). Specifically, the representative LSIs 30 executes control setting for the representative LSI 30 according to the control command included in the control signal received in step S33. The other LSIs 30 executes control setting for the own LSIs 30 according to the control commands converted in step S37.

Figure 13:
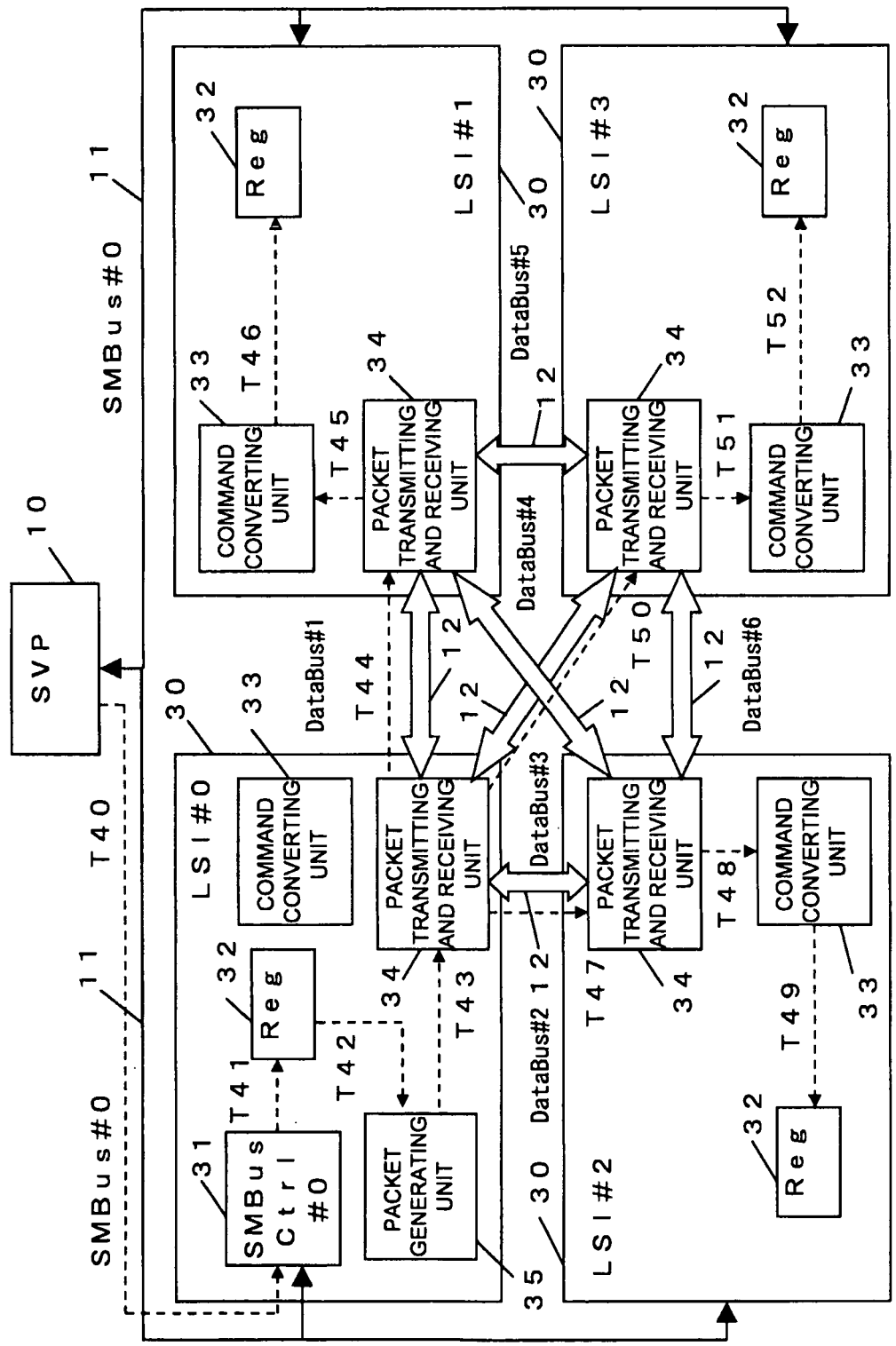
FIG. 13 is a diagram illustrating the operation of the fourth embodiment of the information processing apparatus.

FIG. 13 illustrates the operation of the fourth embodiment of the information processing apparatus. A basic configuration illustrated in FIG. 13 is the same as the configuration illustrated in FIG. 9. In explanation of functional operations, the functional units not directly related to the explanation are not illustrated in FIG. 13. In FIG. 13, an example in which the SVP 10 instructs the LSI #0 to perform broadcast transfer is illustrated. The SVP 10 selects, for example, the LSI #0 as the representative LSI 30. The SVP 10 transmits, via the SMBus #0, a control signal including a control command, control setting targets of which are all the LSIs 30 illustrated in FIG. 13, to the LSI #0, and instructs the LSI #0 to perform broadcast transfer of the control command. The SMBus Ctrl #0 of the LSI #0 receives the control signal including the control command (T40). The Reg 32 receives the transmitted control signal from the SMBus Ctrl #0. The Reg 32 performs, according to the control signal, setting processing for transferring the control command included in the control signal to all the LSIs 30, which are targets of the broadcast transfer (T41). The Reg 32 sends the control command included in the control signal to the packet generating unit 35 (T42). The packet generating unit 35 generates packet data including the control command, and sends the packet data to the packet transmitting and receiving unit 34 (T43). Subsequently, the packet transmitting and receiving unit 34 transmits the generated packet data to the LSI #1 via the Data Bus #1 and the packet transmitting and receiving unit 34 of the LSI #1 receives the packet data (T44).

The packet transmitting and receiving unit 34 of the LSI #1 sends the received packet data to the command converting unit 33 (T45). Subsequently, the command converting unit 33 converts the sent packet data into a control command, sends the converted control command to the Reg 32 (T46), and performs control setting for the LSI #1 according to the control command. In other words, the command converting unit 33 of the LSI #1 is a command converting unit that converts packet data transferred from another control circuit (the LSI #0) other than the own control circuit (the LSI #1) into a command used for control setting for the own control circuit.

Similarly, the LSI #2 and the LSI #3 that receive the packet data from the LSI #0 perform control setting for the own LSIs 30 according to the control command obtained by the conversion of the packet data (T47 to T49 and T50 to T52).

As explained above, in the information processing apparatus, when the SVP 10 performs the control setting of the same content on all the LSIs 30, the SVP 10 transmits a control command of a broadcast transfer target to the selected representative LSI 30. The representative LSI 30 transfers the control command to the other all LSIs 30. Therefore, with the information processing apparatus, when the SVP 10 performs the control setting of the same content on all the LSIs 30, the SVP 10 does not need to transit the control command individually to the respective LSIs 30. As a result, it is possible to reduce load on the SVP 10.

Figure 14:
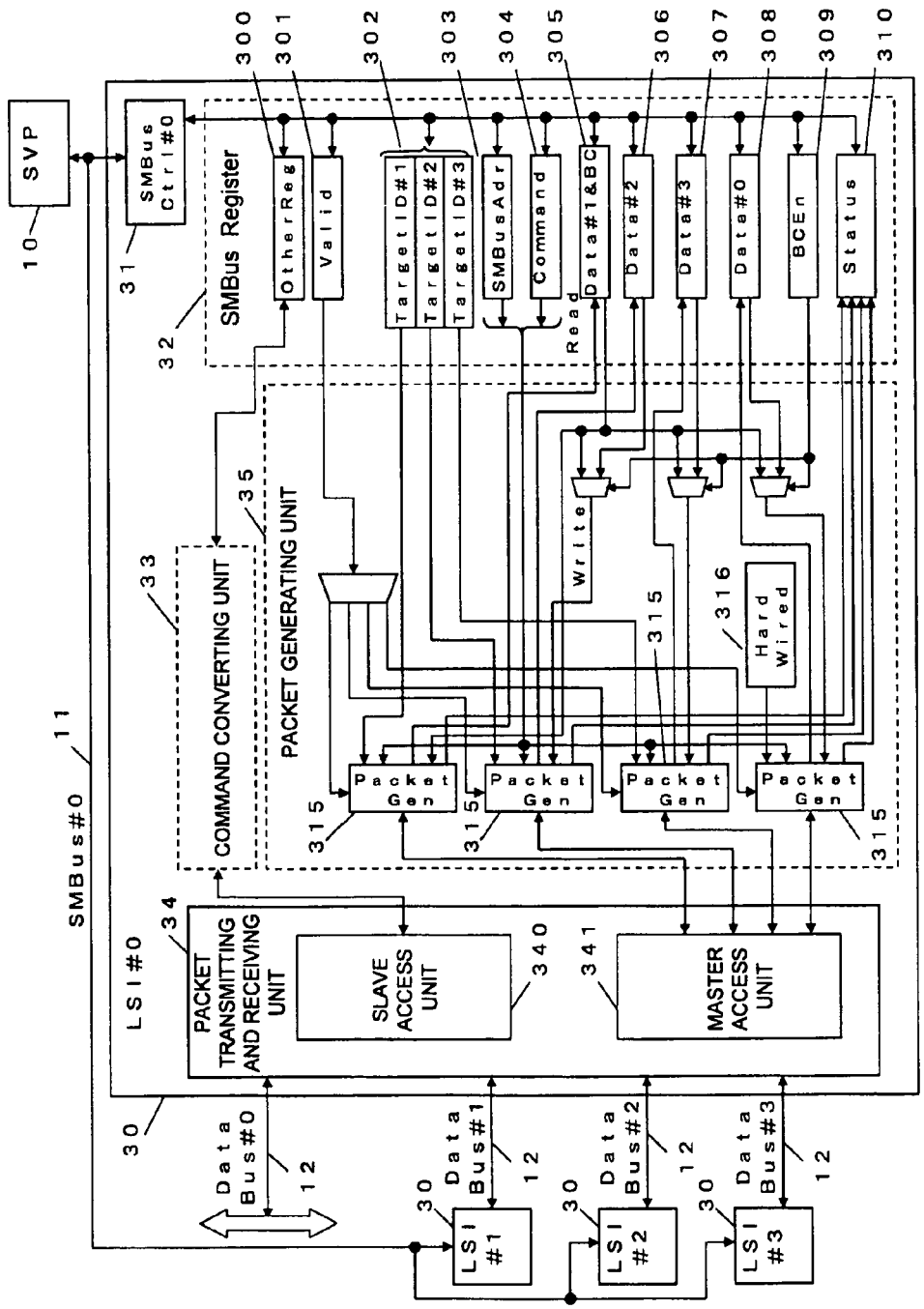
FIG. 14 is a diagram illustrating an example of a detailed circuit configuration of a control circuit.

FIG. 14 is a diagram illustrating an example of a detailed circuit configuration of the LSI 30 explained with reference to FIG. 9. The LSI 30 includes the SMBus Ctrl 31, the Reg (e.g., SMBus Register) 32, the command converting unit 33, the packet transmitting and receiving unit 34, and the packet generating unit 35.

The packet generating unit 35 includes a plurality of Packet Gens 315, a Hard Wire 316, and a plurality of logic circuits. The packet transmitting and receiving unit 34 includes a slave access unit 340 and a master access unit 341. Internal configurations of the packet generating unit 35 and the packet transmitting and receiving unit 34 are explained below.

Each Packet Gen 315 is a functional unit (functional unit of a transfer sequence) that performs exchange of packet data with the packet transmitting and receiving unit 34. The Hard Wire 316 is a hard wire that determines an address of the own LSI 30.

When the own LSI 30 transfers a control command to the other LSIs 30 or when the own LSI 30 functions as the representative LSI 30, the packet transmitting and receiving unit 34 performs reading of transfer data from a corresponding register of the SMBus Register 32 via the Packet Gen 315. Specifically, the master access unit 341 in the packet transmitting and receiving unit 34 sends packet data generated by the packet generating unit 35 to the other LSIs 30. On the other hand, when packet data is sent from the other LSIs 30 to the own LSI 30, the slave access unit 340 sends packet data concerning a control command among the sent packet data to the command converting unit 33.

Functions of registers in the SMBus Register 32 illustrated in FIG. 14 are explained below.

The SMBus Register 32 includes a plurality of registers, i.e., an Other Reg 300, a Valid 301, a Target ID 302, an SMBus Adr 303, a Command 304, a Data 305, a Data 306, a Data 307, a Data 308, a BCEn 309, and a Status 310. The Data 305 indicates Data #1 & BC, the Data 306 indicates Data #2, the Data 307 indicates Data #3, and the Data 308 indicates Data #0.

The SMBus Adr 303, the Command 304, the Data 305, the Data 306, the Data 307, the Data 308, the BCEn 309, and the Status 310 basically respectively have functions same as those of the SMBus Adr 203, the Command 204, the Data 205, the Data 206, the Data 207, the Data 208, the BCEn 209, and the Status 210 illustrated in FIG. 8. Therefore, detailed explanation of the functions is omitted. The Target ID 302 is a register that indicates Target IDs #1, #2, and #3 and stores an ID of the LSI 30 corresponding to a packet transmission destination. The Target IDs #1, #2, and #3 are respectively registers that store IDs of the LSIs #1, #2, and #3.

Figure 15:
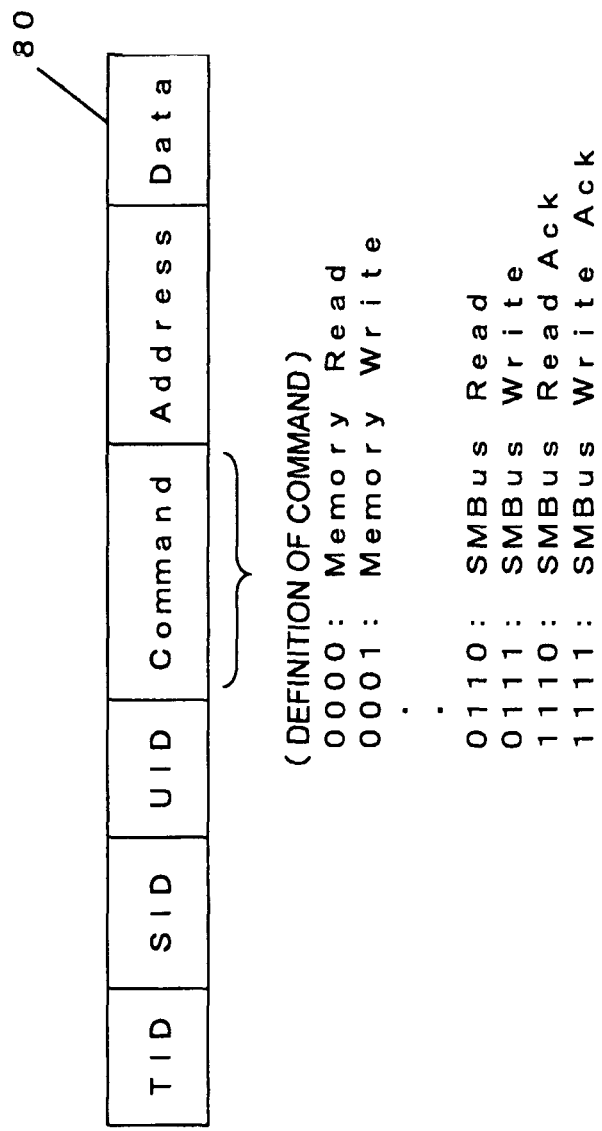
FIG. 15 is a diagram illustrating a packet format example of packet data.

FIG. 15 is an example of a packet format of packet data used by an LSI having a circuit configuration illustrated in FIG. 14. In FIG. 15, data of a packet 80 includes a TID (Target ID), an SID (Source ID), a UID (Unique ID), a Command, an Address, and a Data. The TID indicates an ID of an LSI #n (n=0 to 3) of a destination and the SID indicates an ID of an LSI #m (m=0 to 3) of a transmission source. The UID indicates an ID of a packet. The command indicates command content such as "Read" or "Write" of a memory, "Read" or "Write" of an SMBus, Ack (Acknowledge) obtained when SMBus access is performed, or the like.

The Address indicates an SMBus address of the register in the SMBus Register 32. The Data indicates write data when an access type of the Command section is "Write", and indicates read data when the access type is "Read".

A first operation example of the LSI 30 illustrated in FIG. 14 is explained below. The SVP 10 performs access to the registers of the LSIs 30 via the SMBus #0 illustrated in FIG. 14. When the registers of the LSIs 30 are inaccessible via the SMBus #0, the SVP 10 and the LSI 30 execute operations explained below.

(3-1) When the circuit of the LSI #1 breaks down and the LSI #1 is inaccessible via the SMBus #0, the SVP 10 detects a timeout of a response from the LSI #1 or an error of a transmission code. In this case, after retrying access to the LSI #1 a predetermined number of times, when the LSI #1 is inaccessible, the SVP 10 determines that access abnormality or a failure occurs in the LSI #1.

(3-2) The SVP 10 performs a processing explained below to the register for indirect access of the LSI #0 via the SMBus #0 in order to indirectly access the LSI #1. The SVP 10 writes an ID of the LSI #1 in a Target TID #1 of the LSI #0. The SVP 10 writes an SMBus address of a register to the LSI #1 to be accessed in the SMBus Adr 303. The SVP 10 writes the access type "Read" or "Write" in the Command 304 of the LSI #0. When the access type is "Write", the SVP 10 writes data in the Data #1 of the LSI #0. The SVP 10 writes "1" in a bit of the Valid 301 corresponding to a data bus connected to the LSI #1 of the LSI #0.

(3-3) The packet generating unit 35 of the LSI #0 generates the packet 80 from a value set in a register. The packet transmitting and receiving unit 34 issues, as a transmission packet, the generated packet 80 to the LSI 30 having an ID written in the TID section of the packet 80.

In the generation processing of the transmission packet, the packet generating unit 35 sets an ID value of the LSI #1 in the TID of the packet 80, sets an ID value of the LSI #0 in the SID of the packet 80, sets an ID peculiar to the packet 80 in the UID of the packet 80. Further, the packet generating unit 35 sets a distinction of the access type such as "Read" or "Write" in the Command, and sets an SMBus address of a register to be accessed. The packet generating unit 35 sets written data in the Data when the access type is "Write".

(3-4) The LSI #1 that receives the packet compares an ID of a TID of the packet and an ID of the own LSI 30, and, when the ID of the TID of the packet and the ID of the own LSI 30 coincide with each other, determines that the access is access to the own LSI 30.

(3-5) Subsequently, the LSI #1 decodes the Command, and determines whether the access type is "Read" or "Write".

(3-6) When the access type is "Read", the LSI #1 reads a register corresponding to the SMBus Address set in the Address.

(3-7) The packet generating unit 35 of the LSI #1 generates a response packet. In the processing for generating the response packet, the packet generating unit 35 interchanges the TID and the SID of the transmitted packet 80, and sets value same as values of the UID and the Address of the transmitted packet 80 in a UID and an Address of the response packet. The packet generating unit 35 sets "1110" (refer to FIG. 15) indicating SMBus Read Ack in a Command of the response packet, and does not set data in a Data of the response packet.

(3-8) When the access type is "Write", the LSI #1 writes data of the Data in the register corresponding to the SMBus address set in the Address, and generates a response packet for informing completion of the writing.

In the processing for generating the response packet, the packet generating unit 35 interchanges the TID and the SID of the transmitted packet. The packet generating unit 35 uses values same as values of the transmitted packet in a UID and an Address of the response packet. The packet generating unit 35 sets SMBus Write Ack in a Command of the response packet. The packet generating unit 35 does not give a Data to the response packet.

(3-9) The LSI #0 stores a state of the executed SMBus operation (the operation for transmitting the packet to the LSI #1) in the Status 310 of the LSI #0.

(3-10) The SVP 10 reads the Status 310, and checks success or failure of the access. When the Status 310 maintains a state of in-access, the SVP 10 performs access again after waiting for a predetermined time. When the Status 310 still maintains the state of in-access after the SVP 10 retries a predetermined number of times, the SVP 10 determines that the access ends in failure.

A second operation example of the LSI 30 illustrated in FIG. 14 is explained. When the SVP 10 sets the same value in the same SMBus address in the LSIs #0 to #3, the SVP 10 performs setting of broadcast transfer according to processing explained below.

(4-1) The SVP 10 performs setting processing for the register for indirect access of the LSI #0 in order to indirectly access the LSI #1. The LSI #0 writes the ID value of the LSI #1 in the Target TID #1. The LSI #0 writes the SMBus address of the register of the LSI #1 of the access destination in the SMBus Adr 303. The LSI #0 writes the access type ("Read" or "Write") in the Command 304. When the access type is "Write", the LSI #0 writes data in the Data #1 of the LSI #0. The LSI #0 writes "1" in a corresponding bit of the BCEn 309. The LSI #0 writes "1" in a corresponding bit of the Valid 301 corresponding to the data bus Data Buses 12 (the Data Buses #0 to #3) connected to the own LSI 30.

(4-2) The packet generating unit 35 of the LSI #0 generates a packet based on a value set in the Target ID 302. The packet transmitting and receiving unit 34 issues the generated packet to all the LSIs 30 having an ID written in a TID of the packet.

The LSI #0 also generates a packet, and issues the packet to the own LSI #0. Processing of the LSIs 30 and the SVP 10 after the issuance of the packets is the same as the processing in (3-4) to (3-10) explained above. Explanation of the processing is omitted.

In the information processing apparatus, when the access failure occurs in the access from the system control apparatus to the plurality of control circuits via the serial bus, the system control apparatus can access, via accessible other control circuits, the control circuit which has the relation of the access failure. Consequently, the system control apparatus can transfer the control command to via the other control circuits, and perform control setting for the control circuit which has the relation of the access failure. As a result, the information processing apparatus can prevent a failure that seriously affects the information processing apparatus. The reliability of the information processing apparatus is improved.

Further, in the information processing apparatus, when the system control apparatus performs the control setting of the same content to all of the plurality of control circuits, the system control apparatus selects a representative control circuit, and transmits the control command to the representative control circuit. Further, the representative control circuit transfers a control command used for control setting for the other control circuits. As a result, the information processing apparatus can reduce a load of processing of command exchange in the control setting for the system control apparatus, and reduce time required for the setting of the control circuits.

All examples and conditional language recited herein are intended for pedagogical purpose to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the sprit and scope of the invention.

What is claimed is:

1. An information processing apparatus comprising:
a system control apparatus connected to each of a plurality of control circuits via a first signal line;
a plurality of control circuits each of which is connected to other control circuits other than an own control circuit via second signal lines;
a control signal transmitting unit provided in the system control apparatus that transmits a control signal to the plurality of control circuits via the first signal line, the control signal including a command performing a control setting on the other control circuits other than the own control circuit or to all of the plurality of control circuits;
a signal receiving unit provided in each of the plurality of control circuits that receives the control signal transmitted from the control signal transmitting unit of the system control apparatus via the first signal line;
a signal transfer unit provided in each of the plurality of control circuits that transfers the command included in the control signal received by the signal receiving unit to a control circuit that is a control setting target via the second signal lines;
a control setting unit provided in each of the plurality of control circuits that performs the control setting on the own control circuit according to a command included in the control signal received by the signal receiving unit or a command transferred from the other control circuits other than the own control circuit;

an abnormality determining unit provided in the system control apparatus that determines whether an abnormality occurs in the plurality of control circuits;

a packet generating unit provided in each of the plurality of control circuits that generates packet data including the command included in the control signal transmitted from the control signal transmitting unit of the system control apparatus; and a command converting unit provided in each of the plurality of control circuits that converts the packet data transferred from the other control circuits other than the own control circuit into a command used for the control setting for the own control circuit, and wherein the control signal transmitting unit transmits to the other control circuits other than the own control circuit via the first signal line, a control signal including a command performing the control setting on a control circuit in which the abnormality occurs, and wherein signal transfer units included in the other control circuits transfer, via the second signal lines, the command included in the control signal transmitted from the control signal transmitting unit of the system control apparatus to the control circuit in which the abnormality occurs, wherein the first signal line is a serial bus, and the second signal lines are data buses for packet data to be processed in the plurality of control circuits, and wherein the signal transfer unit transfers, via the second signal lines, the packet data generated by the packet generating unit to the control circuit in which the abnormality occurs.

2. The information processing apparatus according to claim 1, wherein the first signal line and the second signal lines are serial buses.

3. The information processing apparatus according to claim 1, wherein the first signal line and the second signal lines are serial buses, wherein the control signal transmitting unit transmits a control signal including a command that has control setting targets of all of the plurality of control circuits to a single representative control circuit among the plurality of control circuits via the first signal line, and wherein the signal transmitting and receiving unit of the single representative control circuit receives the control signal including the command, and the signal transfer unit of the single representative control circuit transfers the command included in the control signal to the control circuit that is the control setting target via the second signal lines.

4. The information processing apparatus according to claim 1, comprising:

a packet generating unit provided in each of the plurality of control circuits, and that generates packet data including the command included in the control signal transmitted from the control signal transmitting unit of the system control apparatus; and a command converting unit provided in each of the plurality of control circuits that converts the packet data transferred from the other control circuits other than the own control circuit into a command used for the control setting for the own control circuit, wherein the control signal transmitting unit transmits a control signal including a command that has control setting targets of all of the plurality of control circuits to a single representative control circuit among the plurality of control circuits via the first signal line, and wherein the signal transmitting and receiving unit of the single representative control circuit receives the control signal including the command, the packet generating unit of the single representative control circuit generates packet data including the received command, and the signal transfer unit of the single representative control circuit transfers the generated packet data to the control circuit that is the control setting target via the second signal lines.

5. The information processing apparatus according to claim 1, wherein the control signal transmitting unit transmits the control signal including the command performing a control setting on all of the plurality of control circuits to at least a control circuit that is selected as a representative control circuit, and instructs the representative control circuit to perform a broadcast transfer of the command, and wherein the representative control circuit performs the control setting on the own control circuit, and performs the broadcast transfer of the command to the other control circuits via the first signal line.

6. A method controlling an information processing apparatus including a system control apparatus connected to each of a plurality of control circuits via a first signal line, and a plurality of control circuits each of which is connected to other control circuits other than an own control circuit via second signal lines, the method comprising:

transmitting a control signal including a command performing a control setting on the other control circuits other than the own control circuit or to all of the plurality of control circuits from the system control apparatus to the plurality of control circuits via the first signal line;

receiving the control signal transmitted from the system control apparatus via the first signal line by the plurality of control circuits, and transferring the command included in the control signal to a control circuit that is a control setting target via the second signal lines; and performing the control setting on the own control circuit according a command included in the control signal received by the signal receiving unit or a command transferred from the other control circuits other than the own control circuit;

determining whether an abnormality occurs in the plurality of control circuits;

transmitting, to the other control circuits other than the own control circuit via the first signal line, a control signal including a command to perform the control setting on a control circuit in which the abnormality occurs; and transferring, by the other control circuits using the second signal lines, the command included in the control signal transmitted from the system control apparatus to the control circuit in which the abnormality occurs, and wherein the first signal line is a serial bus, and the second signal lines are data buses for packet data to be processed in the plurality of control circuits, wherein the other control circuits generate packet data including the command included in the control signal transmitted from the system control apparatus, and transfer the packet data to the control circuit in which the abnormality occurs via the second signal lines, and wherein the control circuit in which the abnormality occurs converts the packet data transferred from the other control circuits into a command, and performs the control setting for the own control circuit according to the converted command.

7. The method according to claim 6, wherein the first signal line and the second signal lines are serial buses.

8. The method according to claim 6,
wherein the first signal line and the second signal lines are serial buses,
wherein the system control apparatus transmits a control signal including a command that has control setting targets of all of the plurality of control circuits to a single representative control circuit among the plurality of control circuits via the first signal line, and
wherein the single representative control circuit transfers the command included in the control signal to the control circuit that is the control setting target via the second signal lines.

9. The method according to claim 6,
wherein the first signal line is a serial bus, and the second signal lines are data buses for packet data to be processed in the plurality of control circuits,
wherein the system control apparatus transmits a control signal including a command that has control setting targets of all of the plurality of control circuits to a single representative control circuit among the plurality of control circuits via the first signal line,
wherein the single representative control circuit receives the control signal including a command, generates packet data including the command, and transfers the generated packet data to the control circuit that is the control setting target via the second signal lines, and
wherein the control circuit to which the packet data is transferred converts the packet data to a command used for the control setting for the own control circuit, and performs the control setting for the own control circuit according to the converted command.

10. The method according to claim 6,
wherein the system control apparatus transmits the control signal including the command performing a control setting on all of the plurality of control circuits to at least a control circuit that is selected as a representative control circuit, and instructs the representative control circuit to perform a broadcast transfer of the command, and
wherein the representative control circuit performs control setting on the own control circuit, and performs broadcast transfer of the command to the other control circuits via the first signal line.

* * * * *